United States Patent [19]

Moritz et al.

[11] Patent Number: 5,483,664
[45] Date of Patent: Jan. 9, 1996

[54] CELLULAR COMMUNICATIONS WITH SCHEDULED HANDOFFS

[75] Inventors: Steven H. Moritz, Phoenix; Ralph C. Gregg, Jr., Tempe; Theresa C. Y. Wang, Scottsdale, all of Ariz.

[73] Assignee: Motorola, Inc., Schaumburg, Ill.

[21] Appl. No.: 95,505

[22] Filed: Jul. 26, 1993

[51] Int. Cl.⁶ ............................... H04B 7/185; H04Q 7/00
[52] U.S. Cl. ...................... 455/13.1; 455/33.2; 455/54.1; 455/12.1
[58] Field of Search .................. 455/32.1, 33.1, 455/33.2, 33.4, 34.1, 34.2, 54.1, 7, 11.1, 12.1, 13.1, 49.1, 56.1, 13.2, 13.3; 379/59, 60, 61

[56] References Cited

U.S. PATENT DOCUMENTS

| | | | |
|---|---|---|---|
| 4,613,990 | 9/1986 | Halpern | 455/33 |
| 4,670,899 | 6/1987 | Brody et al. | 379/60 |
| 4,811,380 | 3/1989 | Spear | 379/60 |
| 4,866,710 | 9/1989 | Schaeffer | 370/95.1 |
| 4,912,756 | 3/1990 | Hop | 379/60 |
| 4,932,049 | 6/1990 | Lee | 379/60 |
| 4,955,082 | 9/1990 | Hattori et al. | 455/33.3 |
| 4,972,456 | 11/1990 | Kaczmarek et al. | 379/59 |
| 5,018,187 | 5/1991 | Marinho et al. | 379/60 |
| 5,042,082 | 8/1991 | Dahlin | 455/33 |
| 5,067,147 | 11/1991 | Lee | 379/60 |
| 5,081,679 | 1/1992 | Dent | 380/48 |
| 5,101,501 | 3/1992 | Gilhousen et al. | 455/33 |
| 5,134,709 | 7/1992 | Bi et al. | 455/33.1 |
| 5,140,627 | 8/1992 | Dahlin | 379/60 |
| 5,161,248 | 11/1992 | Bertiger et al. | 379/60 |
| 5,257,406 | 10/1993 | Ito | 455/56.1 |
| 5,343,512 | 8/1994 | Wang et al. | 455/33.1 |

FOREIGN PATENT DOCUMENTS

| | | |
|---|---|---|
| 0365885 | 10/1989 | European Pat. Off. . |
| 0421698 | 10/1990 | European Pat. Off. . |
| 0536921 | 9/1992 | European Pat. Off. . |
| 9313618 | 12/1992 | WIPO . |

Primary Examiner—Reinhard J. Eisenzopf
Assistant Examiner—Lee Nguyen
Attorney, Agent, or Firm—Robert M. Handy; Kevin K. Johanson

[57] ABSTRACT

A cellular communications network includes satellites which project cells toward the earth. The satellites and cells move relative to the earth. When a call is being set up to a subscriber unit, data describing the subscriber unit's location are sent to a switching office of the network. The switching office generates a schedule which forecasts when movement of the cells will cause the subscriber unit to cross cell boundaries. During an ongoing call, the subscriber unit 5 determines when scheduled boundary crossings occur. So long as an adequate signal is present in a scheduled cell and network capacity exists in the scheduled cell to handle the call, the call will be handed off to the scheduled cell. The subscriber unit also monitors signal strengths to determine when a traffic channel's signal is getting weak and when an alternate cell's signal is stronger.

32 Claims, 11 Drawing Sheets

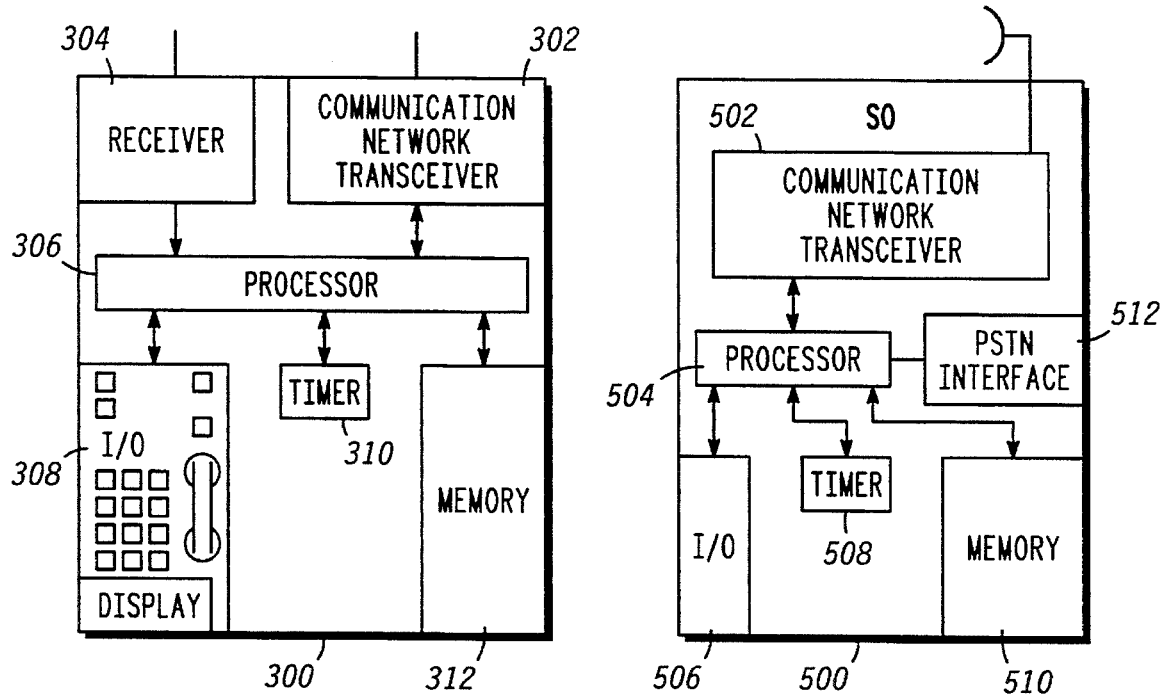
FIG. 3      FIG. 5
FIG. 4
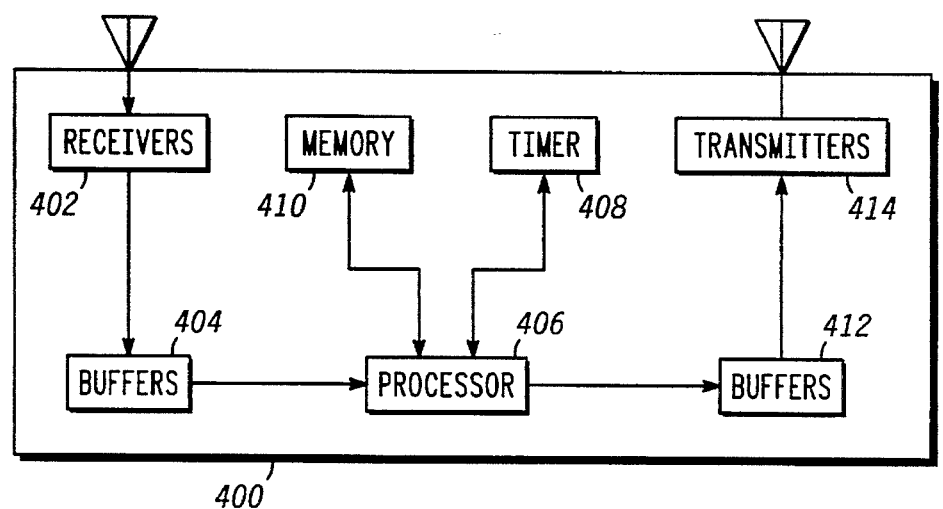

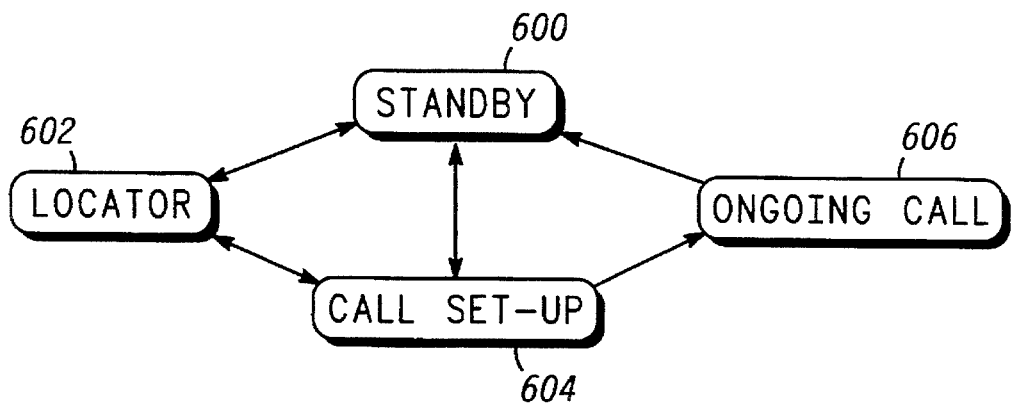
FIG. 6
FIG. 7
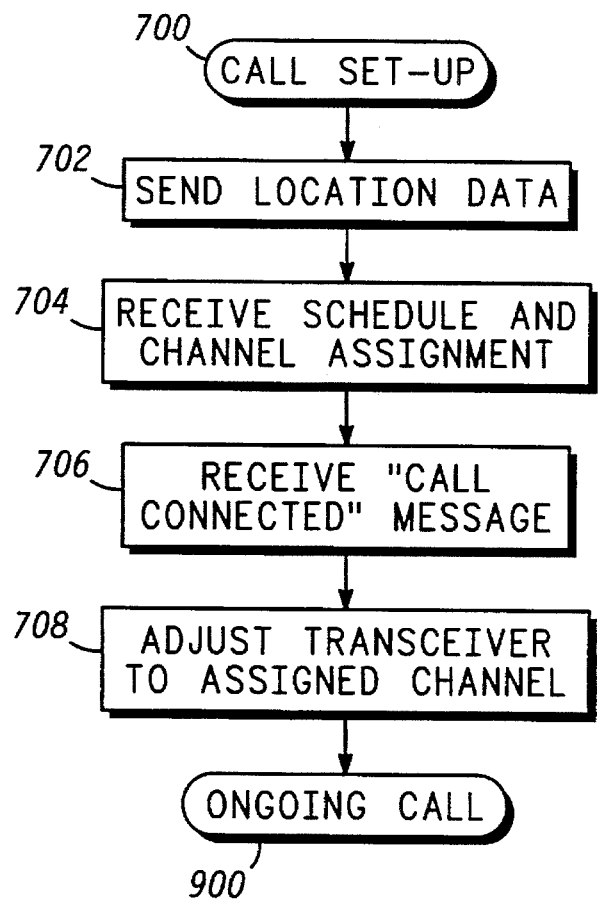

SCHEDULE

| TIME | CHANNEL/CELL LIST |
|------|-------------------|
| —    | —, —, —, —        |
| —    | —                 |
|      | ⋮                 |
| —    | —, —              |

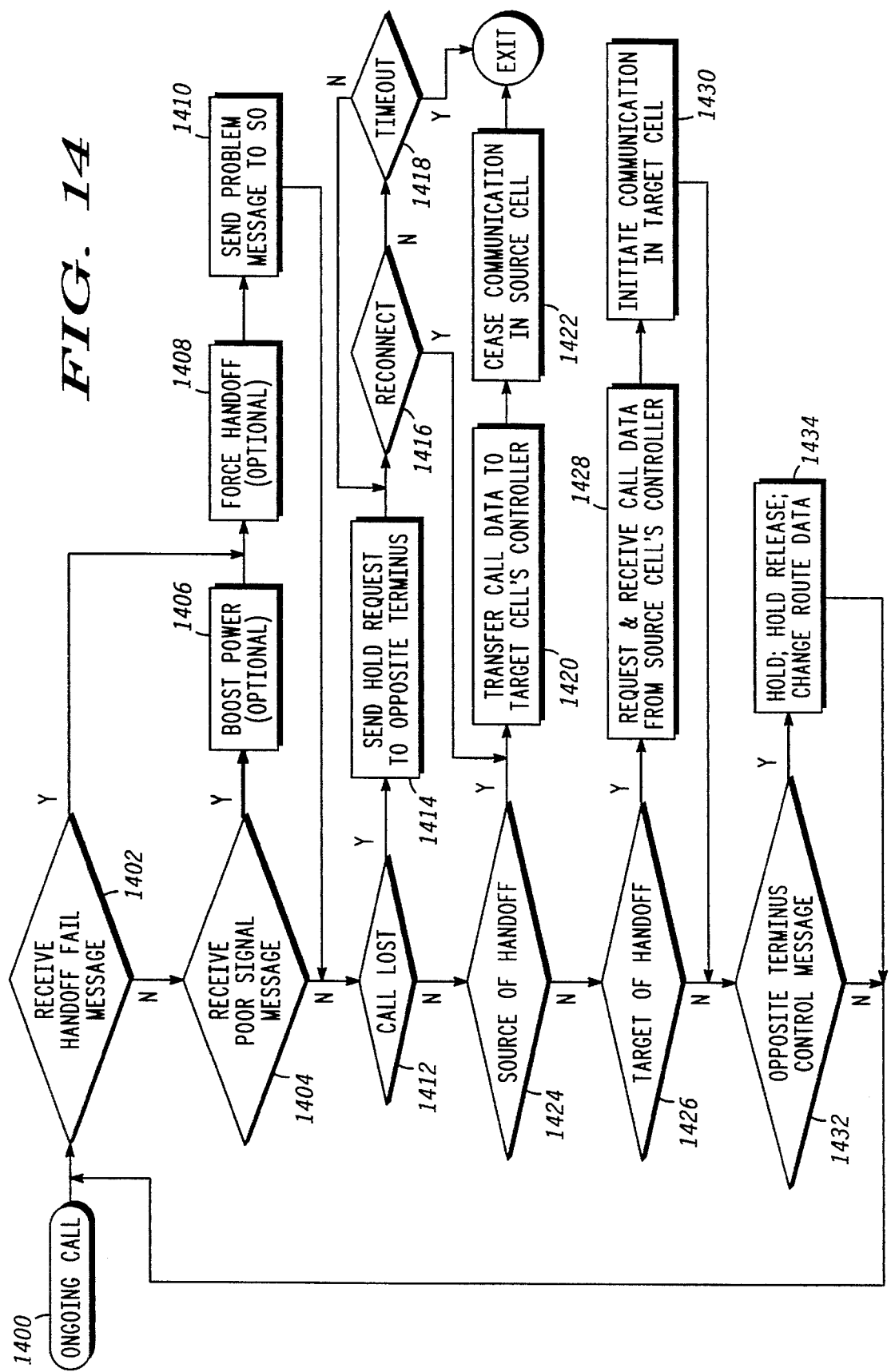

CELLULAR COMMUNICATIONS WITH SCHEDULED HANDOFFS

TECHNICAL FIELD OF THE INVENTION

The present invention relates generally to cellular communications systems. More specifically, the present invention relates to handing off communications between the cells of a cellular communications system.

BACKGROUND OF THE INVENTION

A cellular communications system projects any number of cells over the earth at diverse locations. A frequency spectrum is then allocated in frequency, in time, by coding, or a combination of these, to the cells so that communications taking place in nearby cells use different channels to minimize the chances of interference. On the other hand, communications taking place in cells located far apart may use the same channels, and the large distance between communications in common channels prevents interference. Over a large pattern of cells, a frequency spectrum is reused as much as possible by distributing common channels over the entire pattern so that only far apart cells reuse the same spectrum. An efficient use of spectrum results without interference.

One problem which cellular communications systems address is the handing off of communications between cells. Relative movement between end users and cells causes the end users and the communication links directed thereto to move between cells. In order to permit continuous communications in an ongoing call, the system must "handoff" the call when the end user crosses a cell boundary. If a call is not handed off to a new cell upon leaving an old cell, the call will eventually be lost because the strength of signals over which communications take place would diminish to a point where the system's radio equipment cannot receive the end user's transmissions, or vice versa.

Conventional cellular communications systems address the handoff problem by monitoring and comparing signal strength. A currently used channel associated with one cell may be monitored and compared with a channel associated with another cell. This type of monitoring may be performed by a subscriber unit. Alternatively, a currently used channel may be monitored from locations in two different cells, and the results of this monitoring compared. This type of monitoring may be performed by system equipment located in diverse cells. Communications are then passed off to the cell with the stronger signal.

The conventional handoff technique may work adequately when the distances between subscriber units and system transceivers are relatively small, when the speeds of movement between cells and subscriber units are slow, and when handoffs are relatively evenly distributed in time. Such conditions are present for conventional terrestrial cellular systems in which cells do not significantly move with respect to the earth and the movement between cells and subscriber units results from subscriber movement in accordance with conventional modes of transportation. On the other hand, when system radio equipment is located on satellites orbiting the earth in moving orbits, these conditions are not present, and the conventional handoff techniques may be inadequate.

For example, orbiting satellites are located a relatively large distance from subscriber units, often on the order of several hundred kilometers. The smaller this distance, the greater the speed of the satellite relative to a particular postion on the earth. Speeds of over 20,000 km/hr are typical. This fast movement relative to a subscriber unit introduces widely and rapidly varying propagation delays and Doppler frequency offsets into signals transmitted between a satellite and a subscriber unit. The widely and rapidly varying propagation delays and Doppler frequency offsets make the acquisition and monitoring of signals a difficult and time consuming task, particularly when many different signals may be acquired. Moreover, the great speed of this movement may cause handoffs to occur much more frequently than in conventional cellular systems. For these types of systems not only does the cell pattern move, but its configuration changes with time; cell shutdown occurs so as to maintain channel separation. This leads to another form of imposed handoff.

SUMMARY OF THE INVENTION

Accordingly, it is an advantage of the present invention that an improved system and method for handing off communications between cells in a cellular communications system is provided.

Another advantage is that the present invention schedules handoffs so that at least a large percentage of handoffs may be conducted without the need for excessive signal strength monitoring.

Another advantage is that the present invention conserves network resources.

Another advantage is that the present invention enables the handing off of communications to cells for which signal strengths may be less than a maximum to conserve overall network resources.

Another advantage is that the present invention accommodates handoffs which occur en masse.

The above and other advantages of the present invention are carried out in one form in a cellular communication system which projects a plurality of cells that move with respect to the earth. The present invention may be carried out as a method of handing off subscriber unit communications between cells. The method calls for determining a location of a subscriber unit in a first cell. In response to this determination, a second cell in which said subscriber unit may reside in the future and upcoming timing corresponding to when the subscriber unit may reside in the second cell are scheduled. Communications with the subscriber unit are transferred to the second cell in accordance with this schedule.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a block diagram of a subscriber unit portion of the network;

FIG. 4 shows a block diagram of a satellite portion of the network;

FIG. 5 shows a block diagram of a switching office portion of the network;

FIG. 6 shows a state diagram of processes performed by the subscriber unit;

FIG. 7 shows a flow chart of a Call Set-Up process performed by the subscriber unit;

FIG. 14 shows a flow chart of an Ongoing Call process performed by the satellite;

The description presented below and the Figures are linked together through the use of reference numbers. These reference numbers are chosen to reflect the number of the FIG. in which details of the referenced items may be observed. In particular, the most significant digit of all three-digit reference numbers and the most significant two digits of all four-digit reference numbers equal the number of a Figure in which that referenced feature may be viewed.

DETAILED DESCRIPTION OF THE PREFERRED EMBODIMENTS

Figure 1:
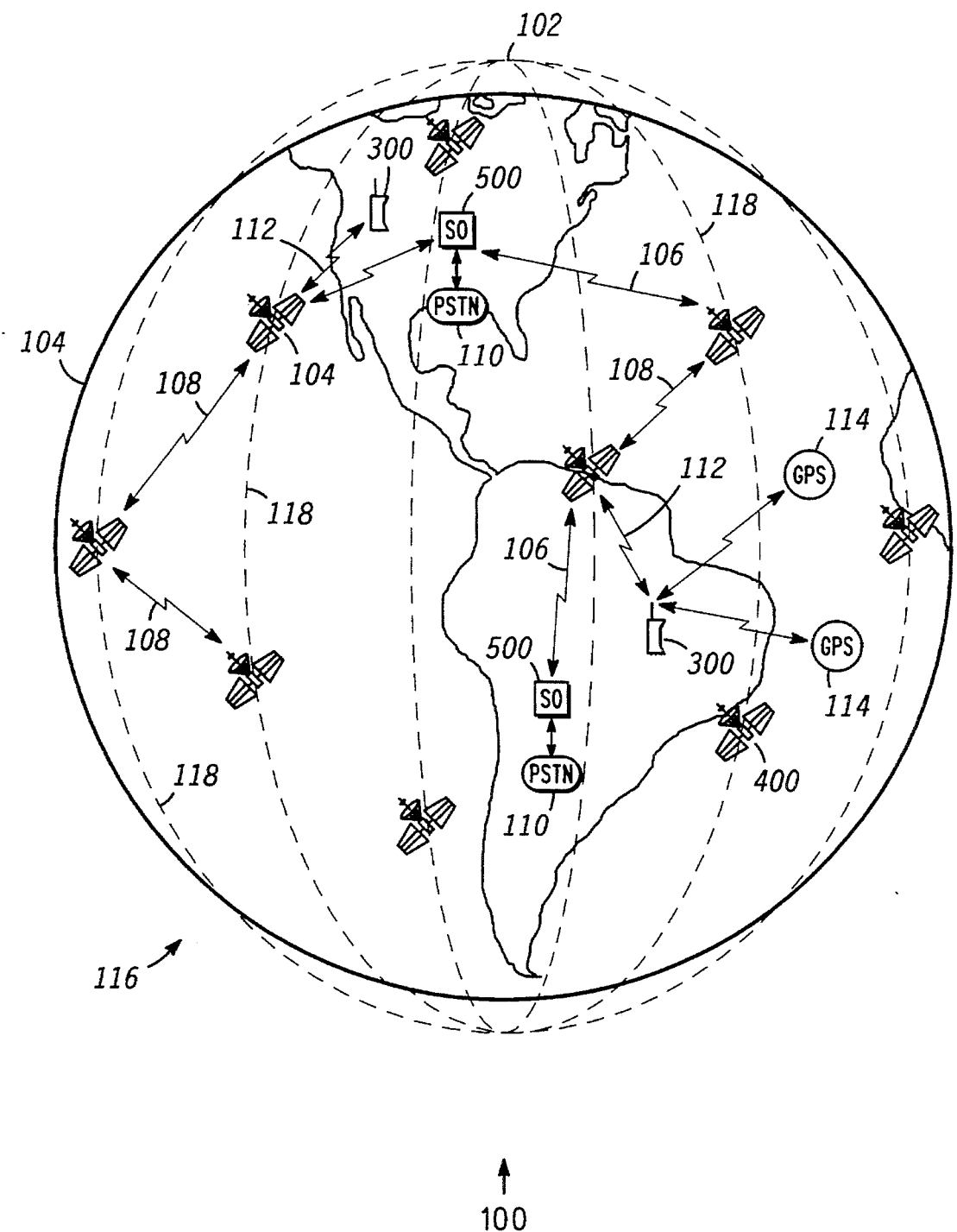
FIG. 1 shows a layout diagram of an environment which supports a cellular communications network within which the present invention may be practiced.

FIG. 1 shows a layout diagram of an environment 100 configured in accordance with a preferred embodiment of the present invention. A constellation 102 consisting of several satellites 400 is placed in a relatively low orbit around the earth 104.

Environment 100 additionally includes one or more switching offices (SOs) 500. SOs 500 reside on the surface of the earth and are in data communication with nearby ones of satellites 400 through RF communication links 106. Satellites 400 are also in data communication with one another through data communication links 108. Hence, through constellation 102 of satellites 400, an SO 500 may control communications delivered to any size region of the earth. However, the region controlled by each SO 500 is preferably associated with one or more specific geopolitical jurisdictions. SOs 500 couple to public switched telecommunication networks (PSTNs) 110, from which calls directed toward subscribers of environment 100 may be received and to which calls placed by subscribers of environment 100 may be sent.

Environment 100 also includes any number, potentially in the millions, of subscriber units (SUs) 300. SUs 300 may be configured as conventional mobile or portable radio communication equipment. Environment 100 accommodates the movement of SUs 300 anywhere within the confines of the earth, whether on or near the surface or in the atmosphere above the earth. However, nothing requires SUs 300 to move, and environment 100 operates satisfactorily if a portion of the entire population of SUs 300 remains stationary. SUs 300 are configured to receive communications from satellites 400 and to perform other functions which are discussed below. SUs 300 communicate with nearby satellites 400 through data communication links 112.

As will be discussed in more detail below, SUs 300 determine their own locations or at least participate in determining their own locations. In one embodiment of the present invention, SUs 300 may use a satellite positioning system 114, such as the Global Positioning System (GPS), in making this determination. System 114 includes a constellation of artificial satellites which orbit the earth. System 114 satellites may be the same or different than satellites 400. In a typical embodiment, the satellites of system 114 are different than satellites 400, but this is not essential. SUs 300 may use conventional techniques to monitor and process signals transmitted by system 114 to determine their own locations. For convenience of explanation, the operation of system 114 is described below for a GPS position locating system. However, the use of a GPS position locating system is not intended to limit the present invention, and those skilled in the art will understand that other position locating systems may be used.

In general terms, environment 100 may be viewed as including a network 116 through which SUs 300 communicate. Network 116 is formed from constellation 102 of satellites 400 and SOs 500. Calls may be connected between two SUs 300, or between an SU 300 and a PSTN phone number. Generally speaking, each SU 300 engages in control communications with a nearby SO 500 through constellation 102 during call set-up. These control communications take place prior to forming a communication path between an SU 300 and another unit, which may be another SU 300 or a PSTN phone number. In particular, an SU 300 communicates with the SO 500 via one or more satellites 400. This SO 500 may be considered the serving SO for that particular SU 300.

Due to the low earth orbits, satellites 400 constantly move relative to the earth. If, for example, satellites 400 are placed in orbits which are around 765 km above the earth, then an overhead satellite 400 travels at a speed of around 25,000 km/hr with respect to a point on the surface of the earth. This allows a satellite 400 to be within view of a point on the surface of the earth for a maximum period of around nine minutes. Due to the relatively low orbits of satellites 400, line-of-sight electromagnetic transmissions from any one satellite cover a relatively small area of the earth at any point in time. For example, when satellites 400 occupy orbits at around 765 km above the earth, such transmissions cover areas around 4075 km in diameter.

While satellites 400 exhibit rapid movement relative to the earth, this movement is highly predictable. Thus, equipment in network 116, such as SOs 500, can accurately and precisely predict satellite movement.

With respect to one another, satellites 400 remain relatively stationary, except for orbits 118 converging and crossing over or intersecting each other in the polar regions. Due to this movement, the distances between satellites 400 that reside in common orbits 118 remain substantially constant. However, the distances between satellites 400 that reside in adjacent orbits, also called cross-plane orbits, 118 vary with the latitudes of the satellites 400. The greatest distance between these cross-plane satellites 400 exists at the equator. This distance decreases as cross-plane satellites 400 approach the polar regions and increases as cross-plane satellites 400 approach the equator.

Figure 2:
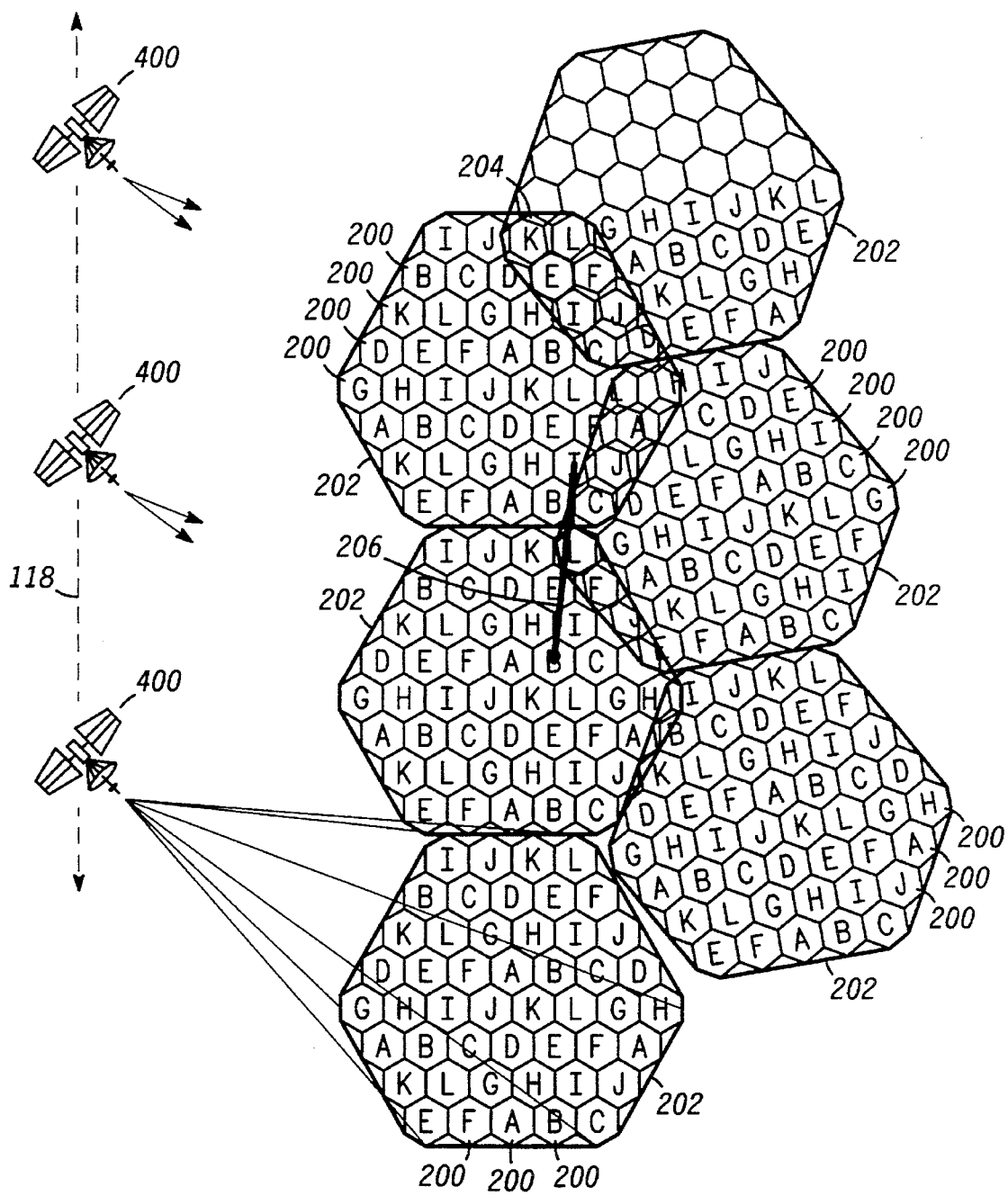
FIG. 2 graphically depicts relative orientations between footprints of cells which may be generated by the network.

FIG. 2 shows a static layout diagram of an exemplary cellular antenna pattern achieved by six of satellites 400, wherein three of the six satellites are sequentially positioned in one orbit 118 and another three of the six satellites 400 are sequentially positioned in an adjacent orbit 118. For clarity, FIG. 2 depicts only the first three of these six satellites 400.

Each satellite 400 includes an array (not shown) of directional antennas. Each array projects numerous discrete antenna patterns on the earth's surface at numerous diverse angles away from its satellite 400. FIG. 2 shows a schematic diagram of a resulting pattern of cells 200 that satellites 400 collectively form on the surface of the earth. With satellites 400 positioned at 765 km above the earth, cells 200 may have a diameter generally in the 400–800 km range. With satellites 400 traveling at speeds of up to 25,000 km/hr with respect to the earth, cells 200 also travel over the earth close to this speed, and any given point on the surface of the earth resides within a single cell 200 for no more than around one minute. Regardless of any movement relative to the earth by SUs 300 (see FIG. 1), network 116 may expect to engage in an extensive number of handoffs, and many calls will experience at least one and quite possibly many more handoffs.

The pattern of cells 200 which a single satellite 400 projects on the earth's surface is referred to as a footprint 202. FIG. 2 depicts footprints 202 as each having forty-eight cells 200. However, the precise number of cells 200 included in a footprint 202 is unimportant for the purposes of the present invention. FIG. 2 further illustrates an overlap 204 which results from the above-discussed convergence of orbits 118. The size of overlap 204 varies in response to the location of the overlapping footprints 202. As can be determined by reference to FIGS. 1–2, the greatest amount of overlap 204 occurs in the polar regions of the earth while little or no overlap occurs in the equatorial regions of the earth. FIG. 2 represents a static snapshot of footprints 202. The portion of overlap 204 which is associated with any two adjacent cross planar footprints 202 changes as satellites 400 move within orbits 118.

Network 116, defines each cell 200 generated from the operation of constellation 102 of satellites 400 as being either active or inactive. Active cells may be viewed as being turned "on" while inactive cells may be viewed as being turned "off". Inactive cells 200 reside in overlap region 204, and cells 200 are dynamically switched to active and inactive states as satellites 400 orbit the earth. Any cell 200 which is not declared as being inactive is defined to be active. Satellites 400 refrain from broadcasting transmissions within inactive cells 200, and any signals received at satellites 400 from inactive cells 200 are ignored.

Generally speaking, the active or inactive nature of cells 200 is determined by first simulating the positions of cells 200 with respect to the earth at a particular point in time. Of course the simulation may be repeated for other points in time to track movement of the constellation 102 of satellites 400. The cell position data may be calculated by applying conventional trigonometric techniques to orbital and antenna geometries. In particular, the cells' positions may be determined from the orbits' positions, the satellites' speed, orbits' distances from the earth, and angles of displacement for various beams supported by the satellites' antennas away from the satellites' Nadir directions. The cell position data may desirably describe the location of the center of each cell 200 on the surface of the earth.

Once cell positions have been simulated, these positions may be analyzed to assign active and inactive status indications to the cells 200. For example, the distances between the center of each cell 200 and the centers of all other cells 200 may be compared with a predetermined distance. When the distance between two of cells 200 is less than this predetermined distance, an overlap is declared between the two cells. In the preferred embodiment, an overlap is declared when at least 70% of two cells 200 occupy the same area. One of the two cells 200 is then assigned an inactive status to cure the overlap. Generally, a cell 200 located toward the outer region of its footprint 202 is assigned an inactive status rather than an overlapping cell 200 located closer to the center region of its footprint 202.

The cell position simulation and assignment process is repeated numerous times to determine when particular cells 200 go active and inactive. Once cells 200 have been assigned active and inactive statuses for particular durations, the cell status data are communicated to satellites 400 as commands so that cells 200 may actually be turned on and off as indicated by the cell status data. The cell status data are also distributed to and retained in all SOs 500 for use in a manner discussed below.

For convenience, FIG. 2 illustrates cells 200 and footprints 202 as being discrete, generally hexagonal shapes without overlap or gaps, other than those attributed to the convergence of orbits 118 near the polar regions of the earth and the divergence of orbits 118 near the equatorial regions of the earth. However, those skilled in the art will understand that in actual practice equal strength lines projected from the antennas of satellites 400 may be more circular or elliptic than hexagonal, that antenna side lobes may distort the pattern, and that some preferably minor overlap between adjacent cells 200 may be expected.

While a preferred orbital geometry for constellation 102 has been described herein, those skilled in the art will appreciate that the communication nodes which satellites 400 provide for network 116 need not be positioned precisely as described herein. For example, such nodes may be located on the surface of the earth or in orbits other than those described herein. Likewise, the precise number of nodes may vary from network to network.

Constellation 102 of satellites 400 communicates with all of subscriber units 300 (see FIG. 1) using a limited amount of the electromagnetic spectrum. The precise parameters of this spectrum are unimportant to the present invention and may vary from network to network. The present invention divides this spectrum into discrete portions, hereinafter referred to as channel sets. Satellites 400 transmit/receive signals to/from active cells using channel sets assigned to the respective active cells. The precise manner of dividing this spectrum is also unimportant to the present invention. For example, the spectrum may be divided into discrete frequency bands, discrete time slots, discrete coding techniques, or a combination of these. Desirably, each of these discrete channel sets is orthogonal to all other channel sets. In other words, simultaneous communications may take place at a common location over every channel in every channel set without significant interference.

Likewise, the precise number of channel sets into which the spectrum is divided is not important to the present invention. FIG. 2 illustrates an exemplary assignment of twelve discrete channel sets to active cells 200. FIG. 2 references the twelve discrete channel sets through the use of the characters "A", "B", "C", "D", "E", "F", "G", "H", "I", "J", "K", and "L". Those skilled in the art will appreciate that a different number of channel sets may be used and that, if a different number is used, the resulting assignment pattern of channel sets to active cells 200 will differ from the assignment pattern depicted in FIG. 2. Likewise, those skilled in the art will appreciate that each channel set may include one channel or any number of orthogonal channels therein, and that nothing requires different channel sets to include the same number of channels therein.

FIG. 3 shows a block diagram of a subscriber unit (SU) 300. Subscriber unit 300 includes a communication network transceiver 302 which transmits and receives signals over data communication link 112 in a format compatible with satellites 400 and network 116. These signals include data messages which allow SU 300 to be in data communication with a nearby satellite 400. Through this satellite 400, SU 300 is also in data communication with any other node of network 116, such as a nearby SO 500. A position location receiver 304 of SU 300, as for example a GPS receiver, receives the signals broadcast by positioning system 114 and generates data describing the current location of SU 300. Transceiver 302 and receiver 304 both couple to a processor 306. Processor 306 additionally couples to an input/output (I/O) section 308, a timer 310, and a memory 312. I/O section 308 of SU 300 collects inputs from a user of SU 300 and provides outputs for the user to perceive. Processor 306 uses timer 310 to monitor real time and to help in maintaining the current date and time. Memory 312 includes data which serve as instructions to processor 306 and which, when executed by processor 306, cause SU 300 to carry out processes which are discussed below. In addition, memory 312 includes variables, tables, and databases that are manipulated due to the operation of SU 300.

FIG. 4 shows a block diagram of a satellite 400. Satellite 400 includes a bank of receivers 402. Receivers 402 receive signals over links 106, 108, and 112 from SOs 500, other satellites 400, and SUs 300, respectively. Receivers 402 couple to receive buffers 404, which temporarily store data received at receivers 402 until these data may be processed. A processor 406 couples to receive buffers 404. Processor 406 additionally couples to a timer 408, a memory 410, and transmit buffers 412. Processor 406 uses timer 408 to monitor real time and to help maintain the current date and time. Memory 410 includes data which serve as instructions to processor 406 and which, when executed by processor 406, cause satellite 400 to carry out processes which are discussed below. In addition, memory 410 includes variables, tables, and databases that are manipulated due to the operation of satellite 400. Transmit buffers 412 are used to temporarily store data placed therein by processor 406. Transmit buffers 412 couple to transmitters 414. Transmitters 414 transmit modulated signals to carry the data stored in transmit buffers 412. These signals are transmitted over links 106, 108, and 112 to SOs 500, other satellites 400, and SUs 300, respectively.

FIG. 5 shows a block diagram of a switching office (SO) 500. Switching office 500 includes a transceiver 502 which transmits and receives signals over data communication links 106 in a format compatible with satellites 400. These signals carry data messages which allow SO 500 to communicate with a nearby satellite 400, with SUs 300 that the SO 500 is currently serving, and with other SOs 500 that the SO 500 may be cooperating with in establishing, managing, or terminating a call. Transceiver 502 couples to a processor 504. Processor 504 also couples to an I/O section 506, a timer 508, a memory 510, and a PSTN interface 512. I/O section 506 receives input from keyboards and other input devices and provides data to display terminals, printers, and other output devices. Processor 504 uses timer 508 to monitor real time and to help maintain the current date and time. Memory 510 includes semiconductor, magnetic, and other storage devices for storing data that serve as instructions to processor 504 and which, when executed by processor 504, cause SO 500 to carry out processes which are discussed below. In addition, memory 510 includes variables, tables, and databases that are manipulated due to the operation of SO 500. Through interface 512, SO 500 communicates with the PSTN 110.

FIGS. 6–7 and 9–12 depict processes performed by an SU 300. Those skilled in the art will appreciate that the processes discussed below in connection with FIGS. 6–7 and 9–12 are controlled by programming instructions placed in memory 312 of SU 300. Moreover, in the preferred embodiment of the present invention, all SUs 300 perform substantially the same processes. Thus, while the description presented below is directed toward a single SU 300, it may be viewed as applying to all SUs 300.

FIG. 6 shows a state diagram of processes performed by SU 300. SU 300 operates in a standby state 600 when SU 300 is powered up and is not engaged in a call. In standby state 600, SU 300 monitors signals broadcast by satellites 400. In the preferred embodiment, at least one broadcast channel is transmitted from satellites 400 in each cell 200. The monitoring of these broadcast signals may entail a search or scan in frequency, in time, and/or in coding. This searching or scanning may be needed to identify a particular one of various potential broadcast channels. For example, when network 116 uses a twelve cell reuse pattern and each cell transmits one broadcast channel, twelve different channels are scanned to determine whether at least one of these channels has an acceptable signal strength, and preferably to determine the one channel that has the best signal strength. Presumably, this best strength signal is associated with the same cell 200 within which an SU 300 currently resides. In addition, frequency searching or scanning may be required to resolve Doppler frequency uncertainty, and time searching or scanning may be required to resolve propagation delay uncertainty. This search is a dynamic process, and the identity of this broadcast channel changes as cells 200 move with respect to SU 300. By monitoring and tracking broadcast channels, SU 300 can determine whether incoming calls are being initiated to it, and SU 300 can determine how to quickly contact network 116 to initiate calls through network 116.

A locator state 602 may, but need not, be entered from standby state 600. SU 300 uses locator state 602 to determine its current location. In one embodiment of the present invention, SU 300 uses its receiver 304 and positioning system 114 to determine its location. Conventional position determination techniques consistent with system 114 may be used to resolve location to any desired degree of accuracy. In another embodiment of the present invention SU 300 omits receiver 304. Locator state 602 causes SU 300 to monitor the broadcast channel to identify the satellite and cell with which the signal is located. The satellite and cell identity may be obtained from data transmitted by satellites 400 over the broadcast channels. This satellite and cell identity gives an indication, albeit somewhat imprecise, of the current location of SU 300. In yet another embodiment of locator state 602, SU 300 omits receiver 304 and monitors timing and frequency changes in a pulse stream transmitted from a satellite 400. After monitoring such changes for a period of time, data are transmitted to a nearby SO 500 for processing to resolve location. These data, when combined with satellite ID and cell ID, provide an indication of location.

SU 300 may enter a call set-up state 604 from standby state 600 when another party is attempting to initiate a call to SU 300 or when SU 300 is attempting to initiate a call to another party. In call setup state 604, SU 300 establishes data communications with network 116 through the cell 200 whose broadcast signal SU 300 is currently monitoring. In the preferred embodiment, SU 300 transmits a message to the satellite 400 responsible for this cell over a random access channel. This message identifies the SU 300 placing the message and requests a communication link with the satellite 400. The satellite 400 responds with a message transmitted over its broadcast channel informing the SU 300 of a secondary control channel which may be used for further communications with the satellite 400. The remaining communications which take place in call set-up state 604 may take place over the secondary control channel.

In the preferred embodiments of the present invention, calls are not routed over the broadcast channels, random access channels, or secondary control channels. Rather, these channels are dedicated to network overhead. These channels have a minimal capacity in order to maximize the capacity of channels available to carry calls. Accordingly, these channels represent scarce resources which, desirably, are used efficiently.

FIG. 7 shows a flow chart of a Call Set-Up process 700 performed by SU 300 in its call set-up state 604. Call Set-Up process 700 performs many conventional tasks (not shown) which are not important to handing off calls. For example, process 700 includes tasks for informing network 116 of the identify of the SU 300, for communicating with network 116 to handle ringing, for communicating with network 116 to identify a called party when SU 300 is initiating the call, for communicating with network 116 to handle answering the call, and for testing for and handling the termination of an attempted call. Although not specifically indicated in FIG. 7, these and other conventional tasks are included in process 700.

Process 700 also includes a task 702 which sends location data to network 116, and particularly to an SO 500 serving the SU 300. Task 702 preferably occurs early in process 700. The location data describe the current location for SU 300. Task 702 may cause SU 300 to temporarily enter locator state 602 to obtain such data if such data are not otherwise available. As discussed above, the present invention contemplates various techniques for obtaining location data. Task 702 may, send data that directly describes the current location for SU 300, or task 702 may send data which can be processed to provide an indication of the location of su 300.

After task 702, and typically after a call being set up is answered, a task 704 causes SU 300 to receive a channel assignment and a schedule 800. The channel assignment is generated by the satellite 400 with which SU 300 is directly communicating. This channel assignment informs SU 300 of a particular traffic channel to use for the upcoming call.

Figures 8, 13:
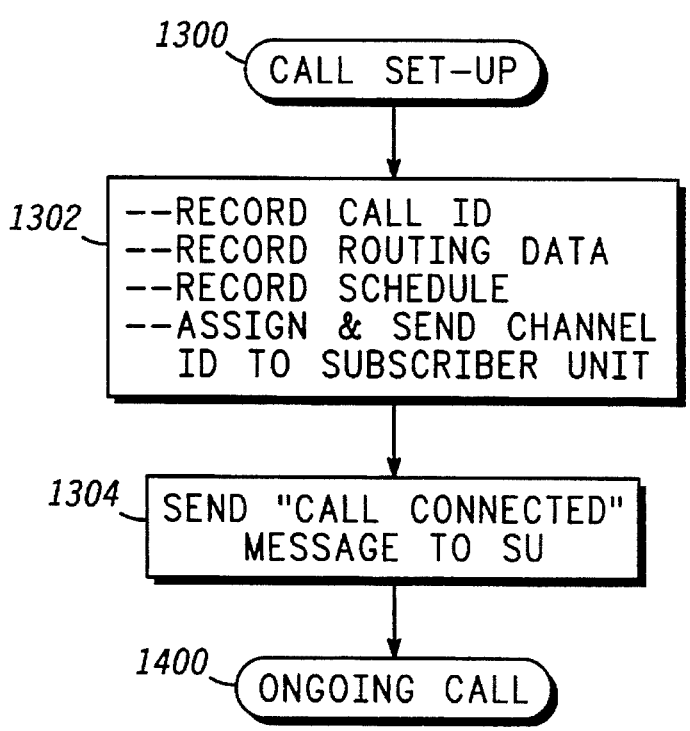
FIG. 8 shows a block diagram of a schedule that may be maintained in memory portions of one or more of the subscriber unit, satellite, and switching office.
FIG. 13 shows a flow chart of a Call Set-Up process performed by the satellite.

FIG. 8 shows a block diagram of schedule 800. Schedule 800 represents a collection of data which are received during task 704 and stored in memory 312 of SU 300. Schedule 800 is preferably generated by the serving SO 500 in response to the location data sent to network 116 during task 702. SO 500 may simulate cell positions relative to the location for a predetermined duration in order to generate schedule 800. However, schedule 800 may be generated elsewhere if more convenient.

Schedule 800 includes time items 802 and channel/cell identity items 804. Each time item 802 has one or more identity items 804 associated with it. Time items 802 indicate points in time when SU 300 may cross a boundary between cells 200. Identity items 804 identify one or more cells 200 which reside on the other side of this boundary. Identity items 804 additionally convey information, either directly or indirectly, which inform SU 300 of the broadcast channels used in the identified cells 200. Moreover, identity items 804 convey information, either directly or indirectly, which informs SU 300 whether the identified cells 200 are included in the same footprint 202 as the current cell 200. In other words, each identity item 804 informs SU 300 whether a handoff forecasted by schedule 800 to a target cell 200 would be an intra-satellite handoff or an inter-satellite handoff. Those skilled in the art will appreciate that channel identity may be inferred from a cell identity, that a satellite identity may be inferred from a cell identity, that a cell identity may be inferred from a channel identity, and the like. Thus, identity items 804 need not specifically and directly indicate each of satellite identity, cell identity, and broadcast channel identity.

The location data sent to network 116 in task 702 may not be absolutely precise but may have some error associated therewith. In other words, the location data may indicate an area within which SU 300 currently resides, not a precise point where SU 300 currently resides. The size of this area corresponds to the amount of error in the location data. Due to this error, SO 500 may not be able to precisely predict which cell 200 SU 300 will enter, particularly when the track of SU 300 runs near a boundary between cells 200. Likewise, SO 500 may not be able to precisely predict when an SU 300 will cross a cell boundary. As discussed above, cell boundaries cannot be precisely defined. Preferably, time items 802 describe the earliest times that SU 300 may cross a boundary to any of the cells 200 identified by the associated identity items 804. Schedule 800 includes more than one identity item 804 in association with a time item 802 when the simulation cannot clearly determine that SU 300 will enter a particular cell 200 and when network 116 does not care which cell 200 receives a handoff. The multiple identity items 804 define the most likely cells 200 that an SU 300 will enter.

Desirably, the number of time items 802 and associated identity items 804 in schedule 800 is determined in response to an average call duration. The length of schedule 800 is preferably large enough to cover all crossings of cell boundaries for the vast majority of calls. For most calls, schedule 800 will contain more cell boundary crossing information than is needed. However, nothing requires schedule 800 to be any particular length, so long as it forecasts at least a couple of upcoming handoffs.

Referring back to FIG. 7, after task 704 causes SU 300 to receive a channel assignment and schedule 800, a task 706 is performed when SU 300 eventually receives a "Call Connected" message from network 116 via the satellite 400 with which SU 300 is directly communicating. The Call Connected message informs SU 300 that the call may now commence. After task 706, a task 708 adjusts reception and transmission parameters of transceiver 302 to the "traffic" channel assigned above in task 704. Future communications take place over this assigned traffic channel.

This future communication in the preferred embodiment includes the transmission and reception of digital data packets encoded with data corresponding to information being conveyed by the call. The data packets are communicated with the satellite 400 that assigned the channel. That satellite 400 is responsible for correctly routing the transmitted data from SU 300 through network 116 to the opposite terminus of the call and for correctly feeding data it receives from the opposite terminus of the call through network 116 to SU 300. Of course, a handoff may cause SU 300 to change its operation so that it will communicate over a different traffic channel in a different cell 200. In the case of an inter-satellite handoff, SU 300 will change its operation so that it will communicate to a different satellite 400 over a different traffic channel in a different cell 200. As shown in FIGS. 6 and 7, after task 708, SU 300 enters ongoing call state 606, where tasks are performed to manage the ongoing call.

Figure 9:
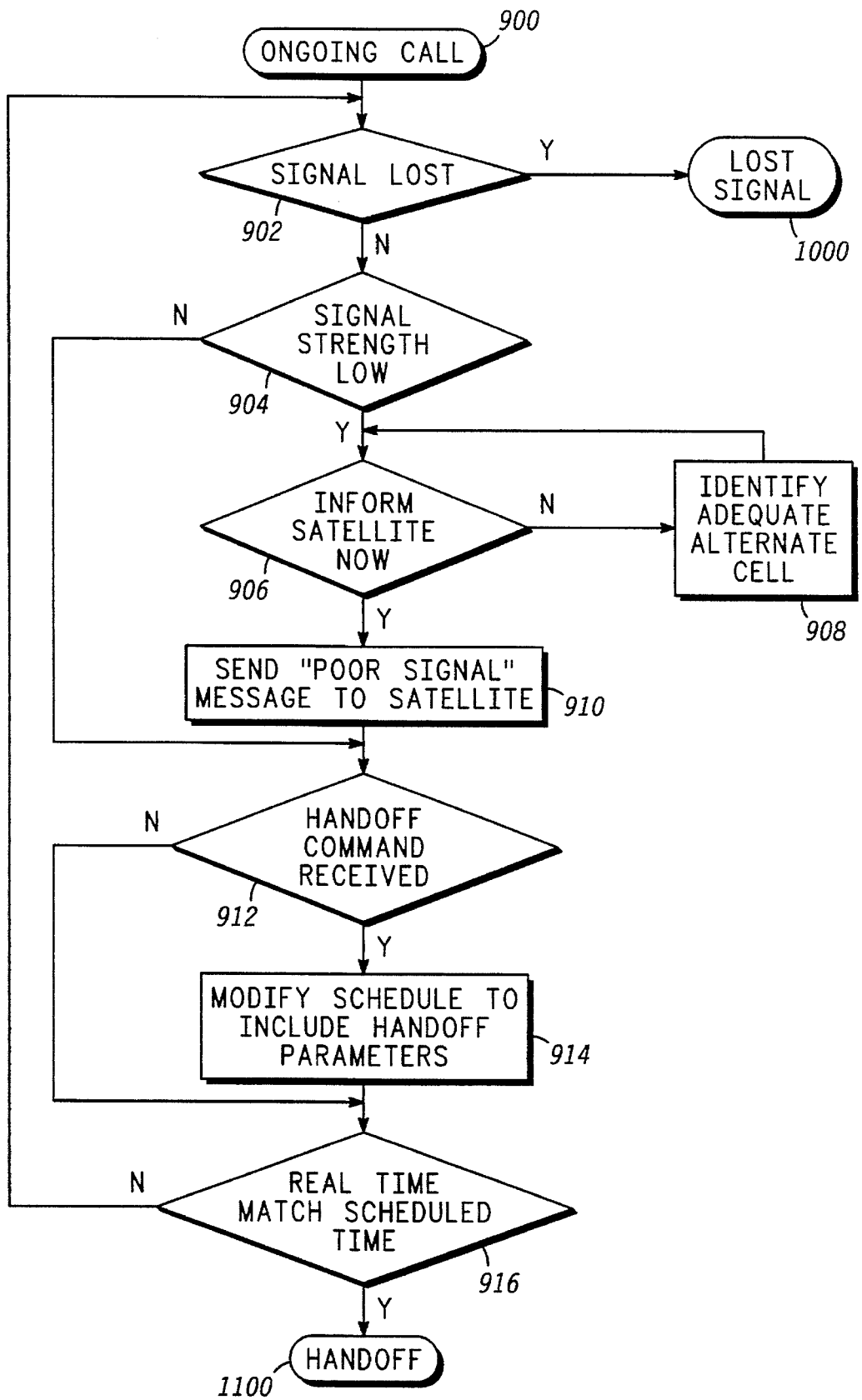
FIG. 9 shows a flow chart of an Ongoing Call process performed by the subscriber unit.

FIG. 9 shows a flow chart of an Ongoing Call process 900 that SU 300 performs in ongoing call state 606. Generally speaking, Ongoing Call process 900 monitors various parameters to determine when a handoff or other action is needed. For example, process 900 determines whether the signal in the current traffic channel has been lost, whether the signal's strength is getting dangerously low, whether a handoff command has been received from network 116, and whether schedule 800 is instructing SU 300 to engage in a handoff.

In particular, a query task 902 determines whether the traffic channel's signal has been lost. This determination may be made, for example, by noticing a loss of lock in transceiver 302 or in any other conventional manner. A traffic channel's signal may become lost for several reasons, including radio interference, movement in or near an interfering structure such as a tunnel, or a failed or missed handoff. When a traffic channel's signal has been lost, program control proceeds to a Lost Signal process 1000.

Figure 10:
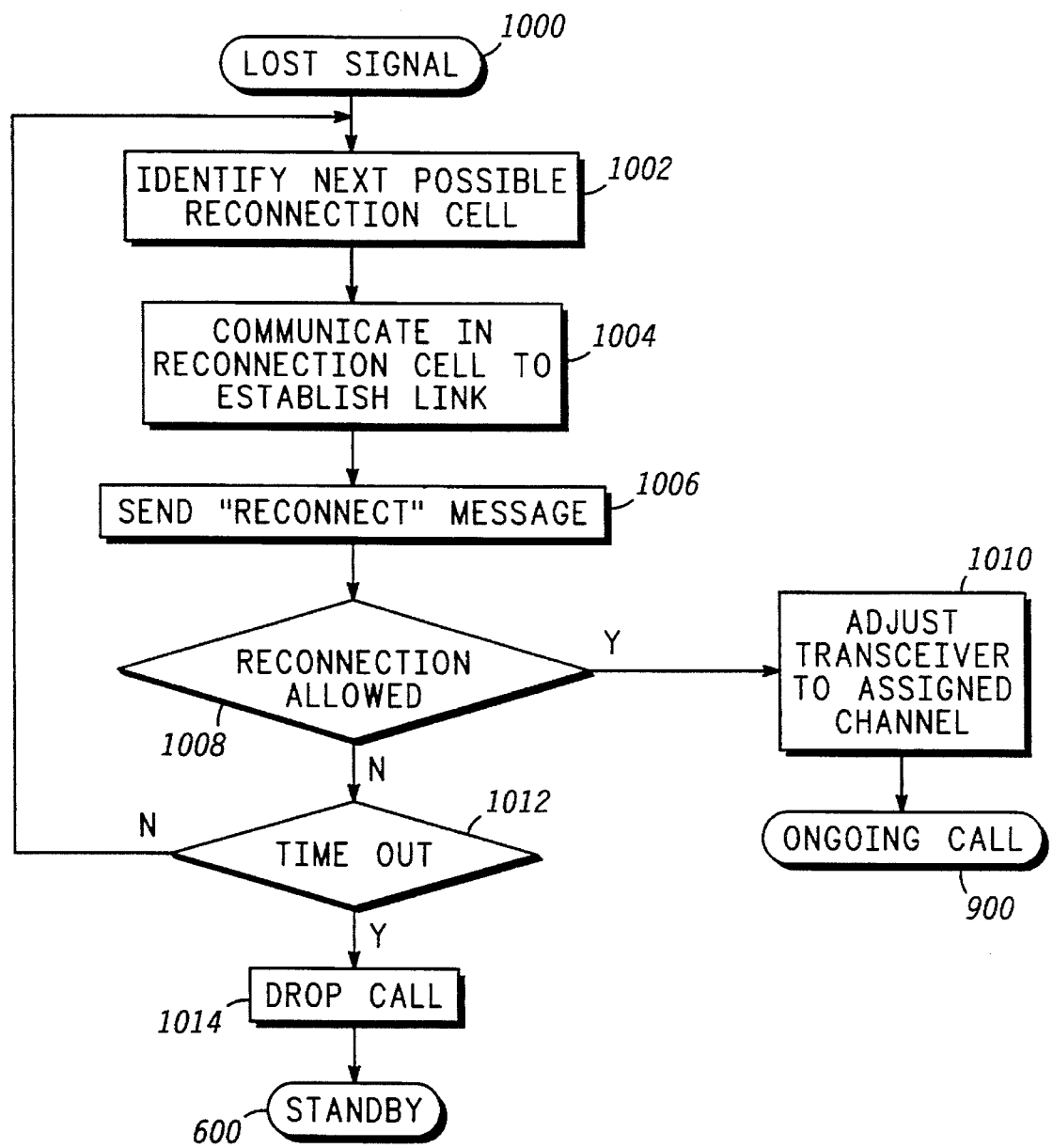
FIG. 10 shows a flow chart of a Lost Signal process performed by the subscriber unit.

FIG. 10 shows a flow chart of Lost Signal process 1000. Generally speaking, Lost Signal process 1000 causes SU 300 to attempt to find any suitable channel of network 116 within a predetermined period of time. If a suitable channel can be found within the allotted time, the call may be reconnected without repeating the call set-up process.

Process 1000 includes a task 1002 which identifies a next possible reconnection cell. Task 1002 causes SU 300 to search or scan for any broadcast channel transmitted in any cell 200. This cell 200 may but need not be the same cell 200 within which the SU 300 was previously communicating. As discussed above, this task of identifying a broadcast channel may require a search in frequency, time, and/or coding in order to acquire a broadcast channel, assuming one is available. Once a broadcast channel has been acquired and its signal is sufficiently strong to suggest that communication is possible in the cell 200 associated with the broadcast channel, process 1000 performs a task 1004.

Task 1004 causes SU 300 to communicate with the satellite 400 responsible for the acquired broadcast channel to establish a communication link with network 116. This communication process is similar to the above-described process. SU 300 transmits a message on a random access channel, the satellite 400 responds with an acknowledgement on the broadcast channel and informs the SU 300 of a secondary control channel to use for further communications.

Once SU 300 receives a secondary control channel assignment, a task 1006 sends a "Reconnect" message to the satellite 400. The Reconnect message informs the satellite that SU 300 is requesting to be reconnected to an ongoing call. The message may include data describing an identification or serial number for the call and data identifying the satellite, cell, and traffic channel being used when the signal was lost.

Preferably, the satellite 400 gives a high priority to responding to a Reconnect message. Assuming that the new reconnection satellite 400 has reserve capacity to handle the call, it communicates with the old host satellite 400 via communication links 108 to obtain all call data, such as routing data and schedule 800, that may be pertinent to this call. Of course, nothing prevents the new reconnection satellite 400 and the old host satellite 400 from being the same satellite 400. In this case the satellite 400 may consult its own memory 410 for the pertinent call data.

When the new reconnection satellite 400 has capacity to carry the call and has obtained all pertinent call data, it sends a "Reconnection Allowed" message back to the SU 300. The Reconnection Allowed message may inform the SU 300 of a new traffic channel to use for communications. When a query task 1008 at SU 300 determines that a reconnection is being allowed, a task 1010 adjusts parameters of transceiver 302 to the new traffic channel, and program control proceeds back to Ongoing Call process 900. Communications may commence over this new traffic channel until a handoff occurs or until this new traffic channel's signal becomes lost.

When task 1008 determines that a reconnection will not be allowed, a query task 1012 determines whether a time out duration has expired yet. The time out duration is set to indicate when the call should be dropped. So long as this duration has not been exceeded, program control returns to task 1002 to attempt to find another cell with which SU 300 can communicate and to reconnect to the call in this other cell. If the time out duration has expired, a task 1014 is performed to drop the call. By dropping the call, the call becomes terminated. The set-up process must be performed again through actions taken by the user in order to continue communications with the opposite terminus of the call. After task 1014, program control returns to standby state 600. Referring back to FIG. 9, when task 902 determines that the signal of the traffic channel has not been lost, Ongoing Call process 900 performs a query task 904. Task 904 determines whether the traffic channel's signal strength is low by comparing signal strength to a predetermined level. Preferably, the predetermined level is set so that a low signal strength indication results when communications over the traffic channel can still take place, but are in danger of being lost if the signal level decreases.

When task 904 determines that the signal strength is low, a query task 906 determines whether to inform the satellite 400 with which the SU 300 is directly communicating of the low signal strength. Task 906 may decide to postpone reporting the low signal strength to satellite 400 and to perform a task 908 instead. Task 908 identifies an alternate cell 200 whose broadcast signal suggests adequate signal strength for communications with SU 300.

Task 908 may first attempt to monitor broadcast channels for cells 200 in the same footprint 202 as the current cell 200. Broadcast channel signals in such intra-satellite cells 200 should be easier and quicker to acquire if available because they have approximately the same Doppler frequency offset and propagation delay parameters as the currently used traffic channel. These parameters are approximately the same because the same satellite 400 is involved in transmitting them. Thus, parameters defining a search or scan in frequency, time, and/or coding are reduced from search parameters required to account for unknown Doppler and propagation delay variations. However, if no intra-satellite cells 200 having broadcast signals of adequate strength are detectable, task 908 may expand its search parameters to try to detect inter-satellite cells 200. The inter-satellite cells 200 reside in a different footprint 202 from the current cell 200. Doppler frequency offset and propagation delay parameters for these inter-satellite cells 200 are different from current Doppler frequency offset and propagation delay parameters and are unknown at this point.

When task 908 has identified an adequate alternate cell, whether an intra-satellite cell 200 or an inter-satellite cell 200, program control proceeds back to query task 906. As discussed above, task 906 determines whether to inform the satellite 400 responsible for the current traffic channel of its low signal strength. This decision may be based on several diverse factors. For example, if the signal strength is at such a dangerously low level that signal loss may be expected at any moment, the satellite 400 may be informed immediately. Otherwise, task 906 may compare the signal strength of the current traffic channel with the signal strength of the acceptable broadcast channel acquired in task 908 and report the low signal strength only when an acceptable alternate cell has a strong enough broadcast signal to suggest a significant improvement over the current traffic channel. If an alternate cell's signal is not a significant improvement, then program control may remain in a loop consisting of tasks 906 and 908 until such a significant improvement is found or until the strength of the current traffic channel deteriorates further.

When task 906 decides to inform satellite 400 of a low signal condition, a task 910 is performed to send a "Poor Signal" message to satellite 400. The Poor Signal message informs satellite 400 that its signal level is low. The Poor Signal message may include the identity of another cell which has a better signal at the SU 300. In addition, the Poor Signal message may include measurement data describing the signal level of the current traffic channel and the signal level of any alternate broadcast channel found through the operation of task 908. After task 910 or when task 904 determines that signal strength is not low, program control proceeds to a query task 912. When a low signal strength is reported to satellite 400 through the operation of tasks 906, 910, and possibly 908, no handoff occurs directly. Rather, SU 300 waits to receive a handoff command from satellite 400.

Query task 912 monitors a small command channel in the traffic channel to determine whether a handoff command has been received from satellite 400. In the preferred embodiments of the present invention, the command channel portion of a traffic channel is small, such as a few bytes per frame, to permit the traffic channel to carry as much call information or traffic as possible. Thus, commands, such as a handoff command, communicated over the traffic channel's command channel are accompanied by a minimal number of parameters. The handoff command may be accompanied by identity data which identify a cell and satellite for the target of the handoff and timing data which indicate when the handoff process should begin. When a handoff command is received, a task 914 modifies schedule 800 saved in memory 312 of SU 300 to include the parameters carried by the handoff command. By modifying schedule 800, the handoff command is queued to be acted upon by SU 300 at the time indicated in the timing data carried by the handoff command. Of course, nothing prevents the handoff command from specifying past or present timing data so that SU 300 will act upon the handoff command immediately.

When task 912 determines that no handoff command has been received or after task 914, process 900 performs a query task 916. Task 916 determines whether real time being monitored by SU 300 matches or exceeds any time item 802 listed in schedule 800. The time items 802 may have been down-loaded during call set-up or specified in a handoff command received from satellite 400. When schedule 800 includes no time item 802 instructing SU 300 to act upon a handoff, program control loops back to task 902. Of course, those skilled in the art will appreciate that process 900 may perform other tasks which are conventional in managing ongoing calls. For example, process 900 may monitor call progress to determine whether a call is being terminated. If a call is terminated, program control exits process 900 and returns to standby state 600. This and other conventional ongoing call tasks may be included in Ongoing Call process 900.

Figure 11:
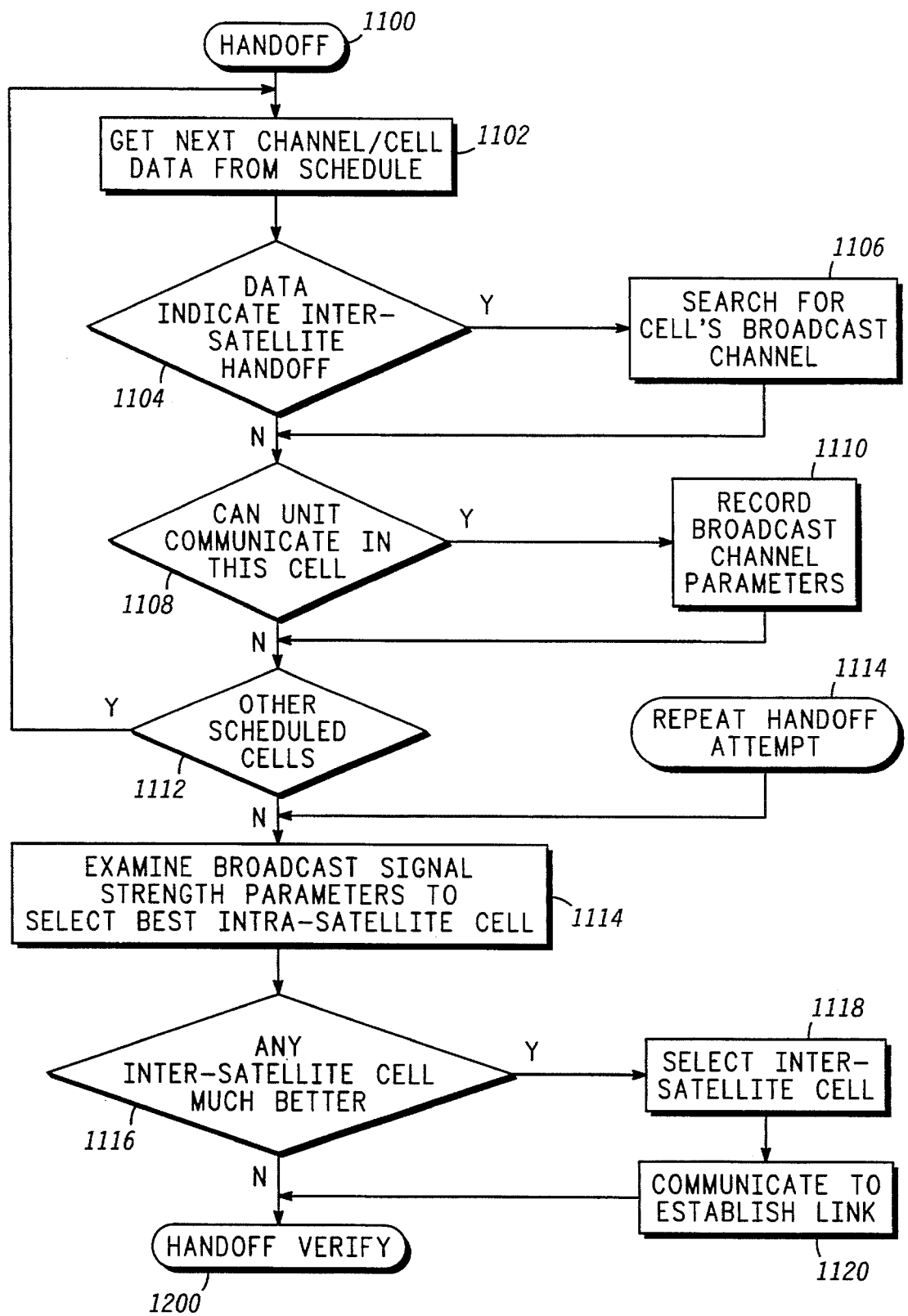
FIG. 11 shows a flow chart of a Handoff process performed by the subscriber unit.

When task 916 identifies a time item that instructs SU 300 to act upon a handoff, program control proceeds to a Handoff process 1100. FIG. 11 shows a flow chart of Handoff process 1100. Generally speaking, Handoff process 1100 causes SU 300 to identify a target cell 200 that it believes will be adequate to receive the handoff. A Handoff Verify process 1200 then verifies that the target cell 200 can accommodate the handoff and transfers communications to the target cell 200.

Handoff process 1100 performs a task 1102 to get the first or next channel/cell identity item 804 from schedule 800. As discussed above, any number of identity items 804 may be associated with a single time item 802. Process 1100 executes a programming loop which examines each identity item 804 one by one for the current time item 802. Identity items 804 additionally include data which identity the satellite 400 associated with the target cell and inform SU 300 whether this target satellite is different from the satellite 400 responsible for the current cell 200. When an identity item 804 has been obtained, a query task 1104 determines whether the item 804 indicates an inter-satellite or an intra-satellite handoff.

If an inter-satellite handoff is indicated, a task 1106 is performed to search in frequency and time for the target cell's broadcast channel. This search in frequency and time is performed to resolve unknown Doppler frequency offset and propagation delays associated with signals broadcast from another satellite 400. However, unlike searches discussed above in connection with tasks 908 and 1002, this search needs to look only for a specific broadcast channel having known parameters except for Doppler frequency offset and propagation delay. Thus, this search may be conducted more quickly than searches which do not have a priori information concerning the known parameters.

For intra-satellite handoffs, this search need not be performed because broadcast channels associated with intra-satellite cells 200 have approximately the same Doppler frequency offset and propagation delay as the current traffic channel. Thus, when task 1104 determines that the identity data 804 indicates an intra-satellite handoff or when task 1106 has completed its search for the inter-satellite cell's broadcast channel, a task 1108 determines whether SU 300 can communicate in the indicated target cell 200. This determination may be made by examining the signal strength of the target cell's broadcast channel to detect a predetermined minimum level. If task 1108 concludes that communication in the identified target cell 200 is possible, a task 1110 records the broadcast channel's parameters, including whether it is associated with an inter-satellite handoff or an intra-satellite handoff, its frequency, timing, Doppler, signal strength, and the like.

When task 1108 concludes that communication in the identified target cell 200 is not possible or when task 1110 is complete, a query task 1112 determines whether other identity items 804 associated with other potential target cells 200 exist for the current time item 802 in schedule 800. Program control loops back to task 1102 to evaluate any other scheduled potential cells and to record their parameters if communication therein is possible. Program control remains in this loop until all cells identified in identity data 804 have been evaluated.

When task 1112 determines that no other scheduled cells are identified in schedule 800 at the current time item 802, a task 1114 examines signal strength parameters of all intra-satellite cells 200 for which parameters were recorded above in task 1110. Task 1114 selects the best one of these potential target intra-satellite cells 200. Next, a query task 1116 determines whether an inter-satellite cell 200 for which parameters were recorded above in task 1110 has a significantly greater or better signal strength.

So long as inter-satellite cells 200 have approximately the same or perhaps even slightly greater signal strength, process 1100 maintains its intra-satellite selection made above in task 1114. All other factors being roughly equal, intra-satellite handoffs are preferred over inter-satellite handoffs because less communications are required over scarce random access and secondary control channels, fewer transmissions are required and, consequently, less power is consumed by SU 300, and fewer chances are presented for dropping the handoff due to drop-outs in communication links 108 between satellites 400. So long as inter-satellite cells' signal strengths are not significantly better than the best intra-satellite cell signal strength, program control proceeds directly to Handoff Verify process 1200.

However, when a potential target inter-satellite cell 200 has a much better signal strength, a task 1118 is performed to select the inter-satellite cell 200 rather than the previously selected intra-satellite cell 200. Next, a task 1120 communicates with the selected inter-satellite cell 200 to establish a data link. As discussed above, this communication involves transmissions from SU 300 over a random access channel associated with the selected inter-satellite cell 200, reception of an acknowledgement from the satellite 400 over its broadcast channel, and tuning to a secondary control channel for this inter-satellite cell 200 as instructed by the target satellite 400 over its broadcast channel. After task 1120, program control proceeds to Handoff Verify process 1200.

Figure 12:
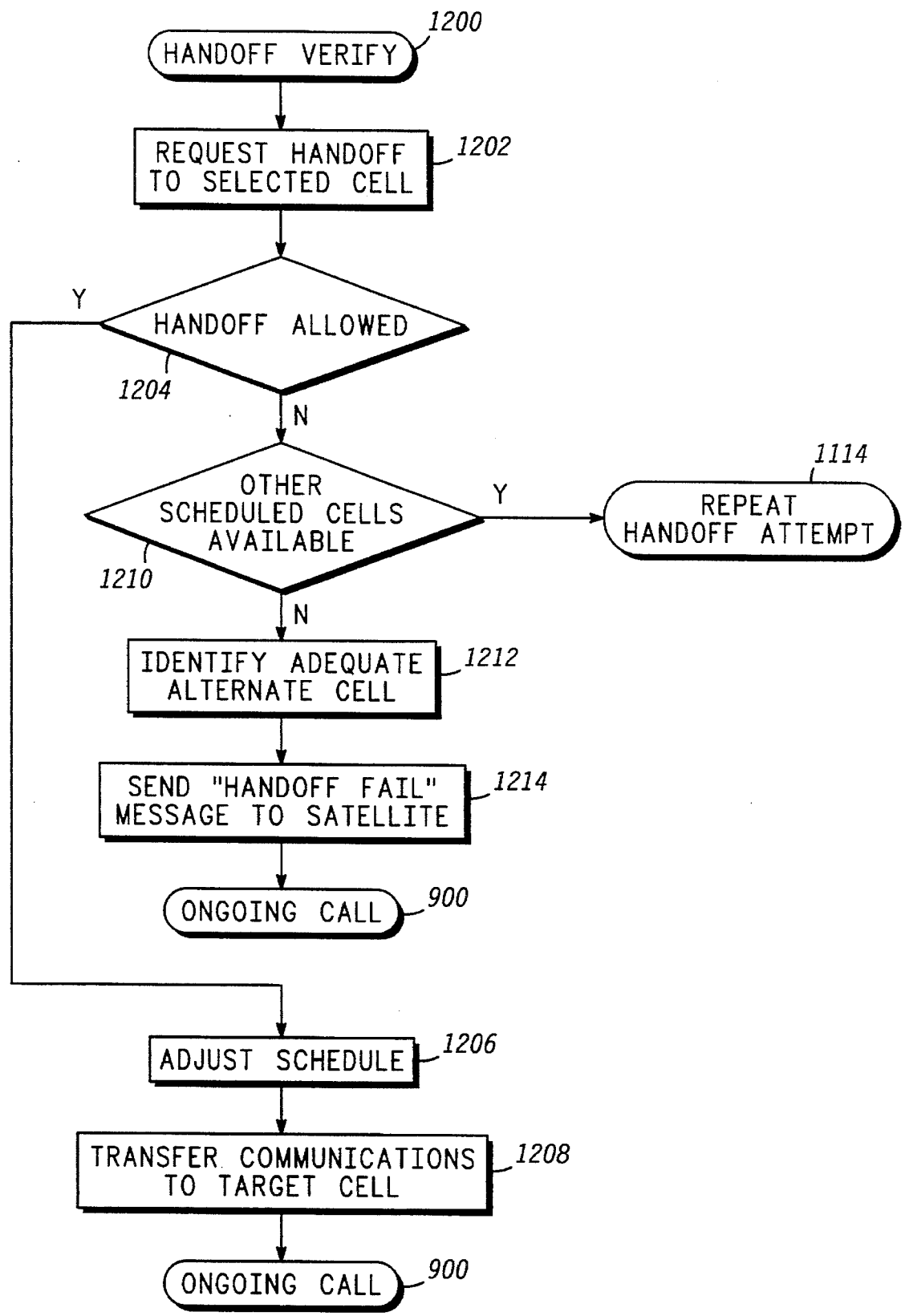
FIG. 12 shows a flow chart of a Handoff Verify process performed by the subscriber unit.

FIG. 12 shows a flow chart of Handoff Verify process 1200. Process 1200 performs a task 1202 to request a handoff to the selected target cell 200. If the selected target cell 200 is an intra-satellite cell, this communication takes place over the control channel associated with the current traffic channel. If the selected target cell 200 is an inter-satellite cell, this communication takes place over the secondary control channel identified above in task 1120.

After task 1202, a query task 1204 waits to receive a response indicating that the handoff will be allowed. Generally, the handoff will be allowed if the capacity exists in the target cell. In the preferred embodiment of the present invention, the response is received over the traffic channel's control channel, which is associated with the host cell. When the target cell 200 is an inter-satellite cell, the target satellite 400 may communicate with the host satellite 400 over a communication link 108 to stimulate this response. This inter-satellite communication also informs the host satellite 400 of the impending handoff and requests the host satellite 400 to transfer pertinent call data back to the target satellite 400. The response to SU 300 preferably specifies a traffic channel to which communications with SU 300 should be switched. This traffic channel is associated with the target cell 200.

When task 1204 determines that a handoff will be allowed, a task 1206 adjusts schedule 800 to indicate that a scheduled time item 802 has now been resolved. Schedule 800 may be adjusted by moving a pointer, erasing data, or setting a flag associated with the current time item 802. Next, a task 1208 transfers communications to the new cell in accordance with the response received above in connection with task 1204. Task 1208 may involve waiting until a point in time specified in the response. At the appropriate time, transceiver 302 will be adjusted to a new traffic channel, and communications will commence over the new traffic channel in the new cell 200, continuing the ongoing call. After task 1208, program control returns to Ongoing Call process 900.

When task 1204 determines that a handoff is not allowed, a query task 1210 determines whether other scheduled potential target cells 200 are available. Scheduled potential target cells 200 are identified by examining the record made above in task 1110. If other scheduled potential target cells 200 are available, program control loops back to task 1114 to repeat a handoff attempt with one of such other target cells 200.

If no other scheduled potential target cells 200 are available at task 1210, a task 1212 is performed to identify an adequate alternate cell. Task 1212 performs a full search for any broadcast signal without substantial a priori knowledge as to frequencies, coding, or timing associated with such broadcast signals. However, task 1212 may first look for broadcast signals from intra-satellite cells 200. These cells 200 have Doppler frequency offset and propagation delays similar to the current traffic channel. If such signals are detectable, they may be acquired more quickly than broadcast signals from inter-satellite cells 200.

After task 1212, a task 1214 sends a "Handoff Fail" message to satellite 400 over the control channel of the traffic channel. The Handoff Fail message may convey information similar to the Poor Signal message discussed above in connection with task 910. If an adequate alternate cell can be identified by SU 300, its identity may be communicated to the satellite 400. However, no handoff occurs unless the satellite 400 commands the handoff to occur, as discussed above in connection with tasks 912 and 914. After task 1214, program control returns to Ongoing Call process 900.

The failure of a scheduled handoff does not necessarily suggest undue risk of dropping a call. For example, the original schedule 800 may have been inaccurate due to errors in location data. If the original schedule is inaccurate, or if a call has continued for a duration longer than was originally forecast in schedule 800, handoffs may be accomplished through monitoring for low signal strength at SU 300 and handoff commands from satellite 400, as discussed above in connection with tasks 904 and 912. However, for a vast majority of the handoffs handled by network 116 and an SU 300, schedule 800 will control the handoff. The use of schedule 800 in controlling handoffs reduces communications on scarce random access and secondary control channels and reduces power consumption by requiring fewer transmissions.

In addition, the use of schedule 800 to control handoffs allows for en masse handoffs between all SUs 300 which may currently be served by a particular cell 200. Such en masse handoffs may be desirable when, for example, a cell 200 is going inactive to cure an overlap 204, as discussed above in connection with FIG. 2. The timing associated with such inactivity events is known to the SO 500 that makes schedules 800 for the SUs 300 it is currently serving. Thus, such switching of cells 200 to an inactive state may be accommodated by schedule 800. Network 116, through the use of schedules 800, may force handoffs to occur gradually prior to a cell 200 going inactive to prevent bottle necks on the random access and secondary communication channels. Managing handoffs by schedule rather than by signal strength permits handoffs to cells 200 which may not have the best signals. Thus, SUs 300 may be handed off to seemingly less optimal target cells 200 before a host, and seemingly better suited, cell 200 is about to go inactive. This allows for an efficient use of network resources.

FIGS. 13 and 14 show flow charts of Call Set-Up and Ongoing Call processes 1300 and 1400, respectively, performed by a satellite 400 to support handoffs. Those skilled in the art will appreciate that the processes discussed below in connection with FIGS. 13–14 are controlled by programming instructions placed in memory 410 of a satellite 400. Moreover, those skilled in the art will appreciate that a multiplicity of calls may be switched through the satellite 400 at any given time and that the processes discussed below in connection with FIGS. 13–14 may be executed independently for each call handled by a satellite 400.

A satellite's Call Set-Up process 1300 may include many conventional call set-up tasks that do not relate to handoffs. However, process 1300 also includes a task 1302 which causes various items of call data to be recorded for use in managing the call. Call data may, for example, include a call ID which identifies or otherwise gives the call a serial number so that it may be identified by network 116. The call data may include data which indicate how to route data packets to an opposing terminus for the call. It may include schedule 800, discussed above. In addition, task 1302 may determine and send a traffic channel assignment to a subscriber unit for the call. This traffic channel assignment and the SU's ID may also be part of the call data. When a call has been set-up and call communications may commence, satellite 400 performs a task 1304 to send the "Call Connected" message to the SU 300 involved in the call. After sending the Call Connected message, satellite 400 performs Ongoing Call process 1400 with respect to the call.

FIG. 14 shows a flow chart of Ongoing Call process 1400. Generally speaking, process 1400 tests for various conditions which relate to the call, and takes certain actions in response to the conditions when they occur. For example, a query task 1402 determines whether a Handoff Fail message has been received. The Handoff Fail message was discussed above in connection with task 1214. SU 300 sends the Handoff Fail message when it cannot engage in a handoff forecast in schedule 800 or commanded by satellite 400.

When no Handoff Fail message has been received, a query task 1404 determines whether a "Poor Signal" message has been received. The Poor Signal message was discussed above in connection with task 910. The Poor Signal message indicates that SU 300 is in danger of losing its link 112 with satellite 400. When the Poor Signal message is received, satellite 400 may take one or more various optional actions. For example, in a task 1406 satellite 400 may boost the power level of its transmissions to SU 300. After considering task 1406, and when the Handoff Fail message has been detected in task 1402, an optional task 1408 may force a handoff. The Handoff Fail and Poor Signal messages may include the identity of a cell whose signals are better for the SU 300. Thus, in task 1408 satellite 400 may send a Handoff Command to the SU 300. Of course, nothing requires satellite 400 to send such a command, and satellite 400 may refrain from sending such a command if, for example, traffic conditions in the suggested cell are excessive or if the suggested cell may be going inactive in the near future. After task 1408, a task 1410 is performed to send a Problem message to the SO 500 serving the SU 300 engaged in the call. The Problem message reports the Handoff Fail or Poor Signal message to the SO 500 along with a description of any action taken by satellite 400. The SO 500 may revise a schedule and/or track such messages for statistical purposes.

After task 1410 or when task 1404 determines that no Poor Signal message has been received, a query task 1412 determines whether the call has been lost. This determination may be made by examining signal strength, monitoring a lock parameter from receivers 402, or in any other convenient fashion. When satellite 400 determines that the call has been lost, a task 1414 sends a Hold Request message through communication links 106 and 108 as required to the opposite terminus of the call so that the opposite terminus will refrain from sending data toward satellite 400 and will know that no data will be forthcoming for a period of time. After task 1414, a query task 1416 determines whether a Reconnect message has been received.

A Reconnect message indicates that the SU 300 has gained access to network 116 as discussed above and wishes to continue with the call. If a Reconnect message is not received, a query task 1418 determines whether a timeout duration has expired. This timeout duration is set to expire when the call should be dropped rather than reserving network resources for the call any longer. So long as the timeout period has not expired, program control loops back to task 1416 to test for a Reconnect message. When the timeout period expires, program control exits Ongoing Call process 1400 with respect to this call. Satellite 400 will then take steps (not shown) to terminate the call.

When a Reconnect message is finally received, a task 1420 may treat the request as though satellite 400 were the source of a handoff. In particular, call data, discussed above in connection with task 1302, may be transferred to the controller of the cell 200 to which the call is to be handed off. Of course, this controller may be the same satellite 400, and nothing prevents a reconnection in the same cell 200 from which a call was lost. In addition, task 1420 may send a control message to the SU 300 informing the SU 300 of the identity of a traffic channel to use for upcoming communications. After task 1420, a task 1422 causes satellite 400 to cease communications with the SU 300 in the source cell. Of course, after the handoff, communications may commence in another cell for intra-satellite handoffs. By ceasing communication, call data are erased or sent to SO 500, and the traffic channel previously used by the call becomes free for use by another call. After task 1422, program control exits Ongoing Call process 1400 with respect to this call.

A query task 1424 may be performed when task 1412 determines that the ongoing call has not been lost. Task 1424 determines whether the current cell for this call is requested to handoff the call to another cell. The request may come from the SU 300 for intra-satellite handoffs or from another satellite 400 for an inter-satellite handoff. In either case, program control proceeds to task 1420 to transfer call records to the target cell's controller, as discussed above.

When task 1424 determines that it is not being asked to act as the source of a handoff, a task 1426 determines whether satellite 400 is being asked to act as the target of a handoff. Task 1424 may not actually be performed in the context of all ongoing calls as suggested by process 1400 since the call is not ongoing with respect to the target cell until after the handoff occurs. Nevertheless, task 1424 is included here for intra-satellite handoffs, and substantially similar tasks take place for inter-satellite handoffs.

When task 1424 determines that a particular cell 200 that is controlled by satellite 400 has been requested to be the target of a handoff, a task 1428 sends a request for call data to the cell controller currently handling the call. For intra-satellite handoffs, this request represents the determination of an address in memory 410 where the call data is currently being kept. For inter-satellite handoffs, this request is sent via communication link 108 to the current source satellite 400 of the call. Preferably, a traffic channel assignment is made and communicated with this request for call data. Once the call data has been obtained from the source cell's controller and the SU 300 has been informed of the handoff traffic channel assignment for the target cell, a task 1430 is performed to initiate communication over the assigned target traffic channel. Task 1430 may include waiting until a point in time specified with the call data occurs.

After task 1430 and when task 1426 determines that the satellite 400 has not been asked to be the target of a handoff, a query task 1432 determines whether any control messages have been received from the opposite terminus of the call. If such messages have been received, a task 1434 takes an appropriate action. For example, task 1434 may put a call on hold if a Hold Request message was received, task 1434 may release a previous hold if a Hold Release message was received, or task 1434 may change routing data in response to a Routing Change message. The routing data is used in routing data packets to the opposite terminus of the call, and the routing change may have resulted from a handoff near the opposite terminus of the call.

After task 1434 or when task 1432 determines that no control message has been received from the opposite terminus of the call, program control loops back to task 1402 to again test for various conditions that may affect the ongoing call. Of course, those skilled in the art will appreciate that Ongoing Call process 1400 may include other tasks conventionally associated with managing an ongoing call, such as detection of call termination (not shown).

Figure 15:
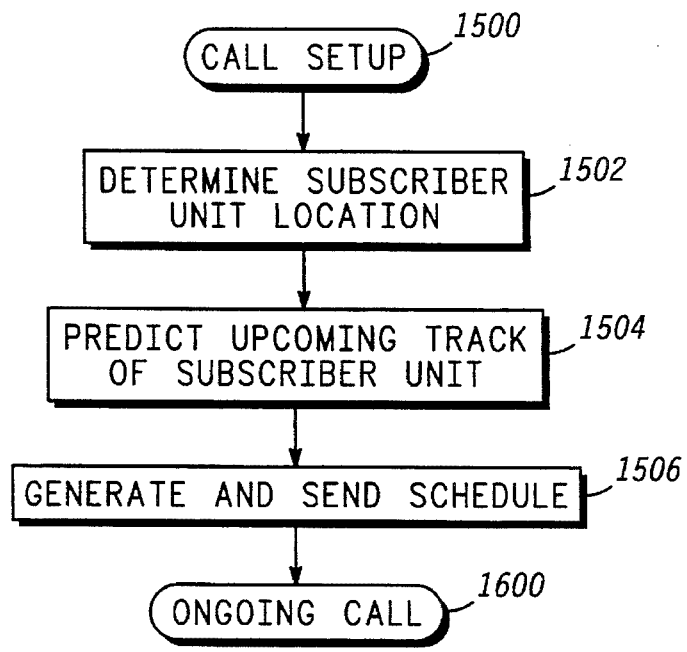
FIG. 15 shows a flow chart of a Call Set-Up process performed by the switching office.
Figure 16:
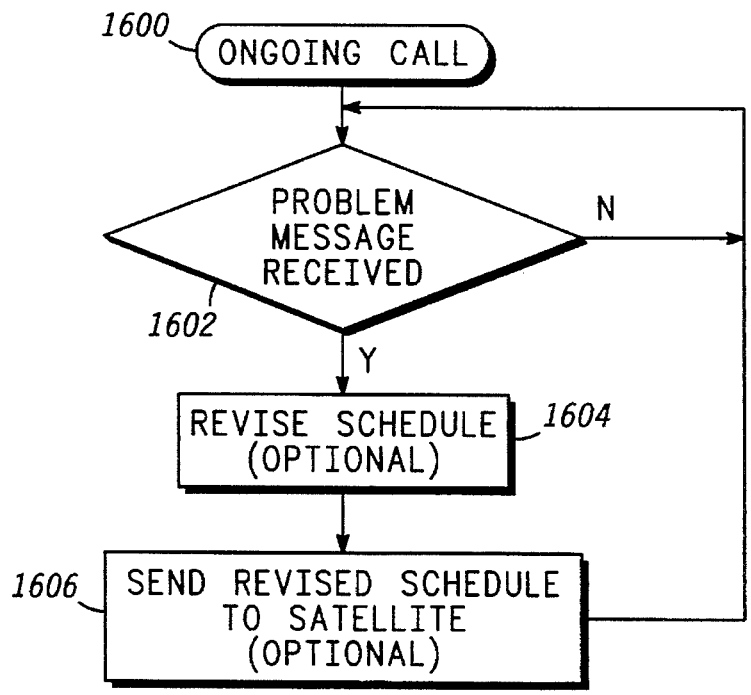
FIG. 16 shows a flow chart of an Ongoing Call process performed by the switching office.

FIGS. 15 and 16 show flow charts of Call Set-Up and Ongoing Call processes 1500 and 1600, respectively, performed by an SO 500 to support handoffs. Those skilled in the art will appreciate that the processes discussed below in connection with FIGS. 15-16 are controlled by programming instructions placed in memory 510 of an SO 500. Moreover, those skilled in the art will appreciate that an SO 500 may handle any number of calls at any given time and that the processes discussed below in connection with FIGS. 15-16 may be executed independently for each call handled by an SO 500.

Call Set-Up process 1500 may include any number of tasks which are conventional in setting up calls but not related to handing off calls. For example, process 1500 may establish a call record (not shown), assign a call ID (not shown), and determine how to route messages to a called party (not shown). In addition to other call set-up tasks, process 1500 performs a task 1502. Task 1502 determines the location of an SU 300 that the SO 500 is serving and that is a party to a call being set up. The location of the SU 300 is determined either directly or indirectly from data supplied by the SU 300, as discussed in connection with locator state 602 and task 702.

After task 1502, a task 1504 predicts an upcoming track for the SU 300 through various ones of cells 200. This prediction is responsive to cell position data, discussed above in connection with FIG. 2, the location data for SU 300, and the current real time. The prediction may simulate the track of SU 300 for a period of time which corresponds to the length of schedule 800, discussed above in connection with FIG. 8. Track 206, illustrated in FIG. 2, represent one hypothetical graphic example of this prediction. In the preferred embodiment, this track is predicted assuming no movement on the part of SU 300. Rather, the track results from simulating the movement of satellites 400 and their cells 200 with respect to the location indicated in the data obtained above in task 1502.

After task 1504, a task 1506 generates schedule 800, and sends schedule 800 to satellite 400 and SU 300. As discussed above, schedule 800 may account for errors in timing by causing time item 802 to indicate the first instant when an SU 300 may cross a cell boundary, and schedule 800 may account for errors in position by including multiple channel/cell identity items 804 when one cell 200 cannot be predicted with certainty. After task 1506, program control proceeds to Ongoing Call process 1600 with respect to this one call.

FIG. 16 shows a flow chart of Ongoing Call process 1600 performed by SO 500 in support of handoffs with respect to a specific call. Process 1600 may perform many tasks which are not related to handing off calls but which are conventional in the management of an ongoing call. For example, process 1600 may respond to a message indicating a call termination and finalize a call record in response to such a message (not shown).

In addition to other tasks performed by process 1600 to manage an ongoing call, process 1600 performs a query task 1602 to determine whether a Problem message has been received from a satellite 400 with respect to this call. A Problem message is sent to SO 500 to report the receipt of a Handoff Fail or Poor Signal message at the satellite 400. The Problem message may indicate that SU 300 has continued a call for a longer duration than schedule 800 was originally intended to cover. If such a message is received, a task 1604 can optionally analyze any data obtained with the message, such as the identity of another cell which the SU 300 has determined as having a better signal, and revise or extend schedule 800. After task 1604 revises or extends schedule 800, a task 1606 may optionally send the revised schedule 800 to satellite 400. Satellite 400 may revise its version of schedule 800 for use in forcing handoffs for this SU 300. Nothing requires the revised or extended schedule 800 to be transmitted to SU 300. After task 1606 and when task 1602 fails to detect the receipt of a Problem message with respect to this call, program control loops back to the start of process 1600.

In summary, the present invention provides an improved system and method for handing off communications between cells in a cellular communications system. The present invention schedules handoffs so that at least a large percentage of handoffs may be conducted without the need for signal strength monitoring. The scheduled handoffs occur primarily as a function of time rather than relative signal strengths. The scheduled handoffs conserve network resources and subscriber unit power by limiting communications on scarce random access and secondary control channels and preventing situations where numerous subscriber units wish to use the random access channels at once. The present invention enables the handing off of communications to cells for which signal strengths may be less than a maximum to meet overall network goals. The scheduled handoff can be particularly advantageous in handling en masse handoffs which may occur when cells go inactive.

The present invention has been described above with reference to preferred embodiments. However, those skilled in the art will recognize that changes and modifications may be made in these preferred embodiments without departing from the scope of the present invention. For example, those skilled in the art will appreciate that, since controllable processors are located in each of SU 300, satellite 400, and SO 500, the processes described above may be distributed differently than indicated. For example, a satellite 400 may retain schedule 800 and not send schedule 800 to SU 300, or SO 500 may retain schedule 800 and not send schedule 800 to either of SU 300 or satellite 400. Satellite 400 or SO 500 may then communicate schedule data to SU 300 as needed. Moreover, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. These and other changes and modifications which are obvious to those skilled in the art are intended to be included within the scope of the present invention.

What is claimed is:

1. In a cellular communication system wherein a satellite projects a plurality of cells that move with respect to the earth, a method of handing-off subscriber unit communications between cells comprising the steps of:

determining a location of a subscriber unit in a first cell;

scheduling, in response to said determining step, a second cell in which said subscriber unit may reside in the future and upcoming timing corresponding to when said subscriber unit may reside in said second cell;

receiving said second cell and said upcoming timing at said subscriber unit; and transferring communications with said subscriber unit to said second cell, upon occurrence of said upcoming timing as determined by said subscriber unit, in accordance with said scheduling step.

2. A method of handing-off subscriber unit communications between cells as claimed in claim 1 wherein:

said method additionally comprises the step of initiating, prior to said scheduling step, a call involving said subscriber unit; and said scheduling step is responsive to a time at which said initiating step is performed.

3. A method of handing-off subscriber unit communications between cells as claimed in claim 2 additionally comprising the steps of:

determining whether said call becomes lost;

identifying a reconnection cell within which said subscriber unit may communicate after said determining step indicates that said call has been lost; and resuming communications with said subscriber unit through said reconnection cell.

4. A method of handing-off subscriber unit communications between cells as claimed in claim 1 wherein said method additionally comprises the steps of:

monitoring a signal strength at which said communications in said second cell take place; and identifying an alternate cell within which said subscriber unit may communicate when said monitoring step indicates that said signal strength is below a predetermined level.

5. A method of handing-off subscriber unit communications between cells as claimed in claim 1 wherein said scheduling step additionally comprises the steps of scheduling a third cell in which said subscriber unit may reside in the future and second upcoming timing corresponding to when said subscriber unit may reside in said third cell, receiving said third cell and said second upcoming timing at said subscriber unit and said method additionally comprises the steps of:

determining, in response to said step of scheduling a third cell, whether said subscriber unit can communicate in said third cell; and transferring said subscriber unit communications to said third cell, upon occurrence of said second upcoming timing as determined by said subscriber unit, when said subscriber unit can communicate in said third cell.

6. A method of handing-off subscriber unit communications between cells as claimed in claim 1 wherein said scheduling step additionally comprises the step of scheduling a third cell in which said subscriber unit may reside in the future and second upcoming timing corresponding to when said subscriber unit may reside in said third cell, and said method additionally comprises the steps of:

determining whether said subscriber unit can communicate in said third cell;

identifying a target cell within which said subscriber unit may communicate when said step of determining whether said subscriber unit can communicate in said third cell indicates that said subscriber unit cannot communicate in said third cell;

transferring said subscriber unit communications to said target cell.

7. A method of handing-off subscriber unit communications between cells as claimed in claim 1 wherein said scheduling step additionally comprising the steps of scheduling third and fourth cells in which said subscriber unit may reside in the future and second upcoming timing corresponding to when said subscriber unit may reside in one or more of said third and fourth cells, receiving said third cell and fourth cells and said second Upcoming timing at said subscriber unit and said method additionally comprises the steps of:

determining whether said subscriber unit can communicate in both of said third and fourth cells;

selecting one of said third and fourth cells when said step of determining whether said subscriber unit can communicate in both of said third and fourth cells indicates that said subscriber unit can communicate in both of said third and fourth cells; and transferring said subscriber unit communications to said selected one of said third and fourth cells upon occurrence of said second upcoming timing as determined by said subscriber unit.

8. A method of handing-off subscriber unit communications between cells as claimed in claim 7 wherein said selecting step comprises the step of monitoring a signal strength in channels that are associated with said third and fourth cells.

9. A method of handing-off subscriber unit communications between cells as claimed in claim 8 further comprising the steps of:

projecting said second and third cells from a first satellite orbiting the earth, and projecting said fourth cell from a second satellite orbiting the earth; and said selecting step comprises the step of choosing said third cell when said signal strengths for channels associated with said third and fourth cells are approximately equal.

10. A method of operating a subscriber unit in accordance with a cellular communication system wherein a satellite projects a plurality of cells which move over the earth, said method comprising the steps of:

receiving, through a first one of said cells, a schedule that associates timing data with a channel identity, said channel identity being associated with a second one of said cells;

monitoring real time to determine when a time described by said timing data from said schedule occurs; and upon occurrence of said time described by said timing data, transferring communications from said first cell to said second cell in response to said monitoring step.

11. A method of operating a subscriber unit as claimed in claim 10 additionally comprising the steps of:

determining, in response to said monitoring step, whether said channel whose identity is listed in said schedule in association with said timing data indicates that communication in said second cell is possible; and performing said transferring step when said determining step indicates that communication in said second cell is possible.

12. A method of operating a subscriber unit as claimed in claim 10 wherein said receiving step comprises the steps of:

receiving said schedule during the step of initiating a call involving said subscriber unit; and providing said schedule timing data responsive to the time that said initiating step is performed.

13. A method of operating a subscriber unit as claimed in claim 12 wherein said method additionally comprises the steps of:

monitoring a signal strength at which said communications in said second cell take place; and identifying an alternate cell within which said subscriber unit may communicate when said monitoring step indicates that said signal strength is below a predetermined level.

14. A method of operating a subscriber unit as claimed in claim 12 additionally comprising the steps of:

determining whether said call becomes lost;

identifying a reconnection cell within which said subscriber unit may communicate when said determining step indicates that said call has been lost; and resuming communications through said reconnection cell.

15. A method of operating a subscriber unit as claimed in claim 10 wherein said step of receiving comprises the step of:

receiving a schedule that associates a plurality of timing data items with a corresponding plurality of channel identities and wherein said plurality of channel identities are associated with a corresponding plurality of said cells.

16. A method of operating a subscriber unit as claimed in claim 10 wherein said step of receiving comprises the step of receiving a schedule additionally including second timing data associated with a second channel identity, wherein said second channel identity is associated with a third one of said cells, and said method additionally comprises the steps of:

monitoring real time to determine when a time described by said second timing data from said schedule occurs;

determining whether said second channel whose identity is listed in said schedule indicates that communication in said third cell is possible;

identifying a target cell within which said subscriber unit may communicate when said determining step indicates that said subscriber unit cannot communicate in said third cell; and transferring said subscriber unit communications to said target cell.

17. A method of operating a subscriber unit as claimed in claim 10 wherein said step of receiving comprises the step of receiving a schedule additionally including second timing data associated with second and third channel identities, said second and third channel identities being associated with third and fourth cells, respectively, and said method additionally comprises the steps of:

determining whether said second and third channels whose identities are listed in said schedule indicate that communication in said both of said third and fourth cells is possible;

selecting one of said third and fourth cells when said determining step indicates that said subscriber unit can communicate in both of said third and fourth cells; and transferring said subscriber unit communications to said selected one of said third and fourth cells.

18. A method of operating a subscriber unit as claimed in claim 17 wherein said selecting step comprises the step of monitoring the strength of signals in said second and third channels.

19. A method of operating a subscriber unit as claimed in claim 18 further comprising the steps of:

projecting said second and third cells from a first satellite orbiting the earth, and projecting said fourth cell from a second satellite orbiting the earth; and said selecting step further comprises the step of choosing said third cell when said signal strengths for said second and third channels are approximately equal.

20. A cellular communications system with scheduled handoffs comprising:

a plurality of satellites orbiting so as to move with respect to the earth, said satellites collectively projecting a plurality of cells toward the earth;

a subscriber unit in data communication with one of said satellites through a first one of said cells, said subscriber unit including a position location receiver for providing data describing a location for said subscriber unit;

a scheduler, responsive to said position location receiver, for generating a schedule which associates a channel used in a second cell of said plurality of cells with timing data that describe when said subscriber unit may reside in said second cell, said schedule being sent to said subscriber unit for use in handoff decisions; and means, coupled to said scheduler, for transferring communications for said subscriber unit to said second cell, upon occurrence of said timing data as determined by said subscriber unit in accordance with said schedule.

21. A cellular communications system as claimed in claim 20 wherein:

said system additionally comprises means, in data communication with said scheduler and said subscriber unit, for initiating a call involving said subscriber unit; and said scheduler is configured so that said timing data are responsive to the time at which said call is initiated.

22. A cellular communications system as claimed in claim 21 wherein said means for initiating is configured to transfer said schedule to said subscriber unit prior to commencing said call.

23. A cellular communications system as claimed in claim 21 wherein said subscriber unit comprises:

means for monitoring a signal strength at which said communications in said second cell take place; and means for identifying an alternate cell within which said subscriber unit may communicate when said signal strength monitored by said monitoring means falls below a predetermined level.

24. A cellular communications system as claimed in claim 20 wherein said scheduler is configured so that said schedule associates a second channel used in a third cell of said plurality of cells with second timing data that describe when said subscriber unit may reside in said third cell, and said subscriber unit comprises:

means for determining whether said subscriber unit can communicate in said third cell; means, coupled to said determining means, for identifying a target cell within which said subscriber unit may communicate when said subscriber unit cannot communicate in said third cell; and means, coupled to said identifying means, for transferring said subscriber unit communications to said target cell.

25. A cellular communications system as claimed in claim 20 wherein said scheduler is configured so that said schedule associates second and third channels used in third and fourth cells, respectively, of said plurality of cells with second timing data that describe when said subscriber unit may reside in one or more of said third and fourth cells, and said subscriber unit comprises:

means for determining whether said subscriber unit can communicate in both of said third and fourth cells;

means, coupled to said determining means, for selecting one of said third and fourth cells when said subscriber unit can communicate in both of said third and fourth cells; and means, coupled to said selecting means, for transferring said subscriber unit communications to said selected one of said third and fourth cells.

26. A subscriber unit which undergoes scheduled handoffs and which operates in accordance with a cellular communications system wherein satellite projects a plurality of moving cells, said subscriber unit comprising:

a schedule receiver for receiving, via communications conducted in a first cell of said plurality of moving cells, a schedule that associates timing data with a channel identity, said channel identity being associated with a second cell of said plurality of moving cells;

a timer, coupled to said schedule receiver, for monitoring real time to determine when a time described by said timing data from said schedule occurs; and means, coupled to said timer, for transferring communications from said first cell to said second cell upon occurrence of said timing data in accordance with said schedule.

27. A subscriber unit as claimed in claim 26 additionally comprising means, coupled to said schedule receiver, to said timer, and to said transferring means, for determining whether said channel whose identity is listed in said schedule in association with said timing data indicates that communication in said second cell is possible.

28. A subscriber unit as claimed in claim 26 additionally comprising:

means, coupled to said schedule receiver, for initiating a call involving said subscriber unit;

means, coupled to said call initiating means, for monitoring a signal strength at which communications take place during said call; and means, coupled to said monitoring means, for identifying an alternate cell within which said subscriber unit may communicate when said signal strength is below a predetermined level.

29. A subscriber unit as claimed in claim 28 wherein said schedule receiver is configured to receive said schedule prior to commencing said call.

30. A subscriber unit as claimed in claim 28 additionally comprising:

means, coupled to said call initiating means, for determining whether said call becomes lost;

means, coupled to said determining means, for identifying a reconnection cell within which said subscriber unit may communicate when said call has been lost; and means, coupled to said identifying means, for resuming communications through said reconnection cell.

31. A subscriber unit as claimed in claim 26 wherein:

said schedule additionally includes second timing data associated with a second channel identity, said second channel identity being associated with a third cell of said plurality of moving cells;

said timer is configured to determine when a time described by said second timing data from said schedule occurs; and said subscriber unit additionally comprises:

means, coupled to said schedule receiver, for determining whether said second channel whose identity is listed in said schedule indicates that communication in said third cell is possible, means, coupled to said determining means, for identifying a target cell within which said subscriber unit may communicate when said subscriber unit cannot communicate in said third cell, and means, coupled to said identifying means, for transferring said subscriber unit communications to said target cell.

32. A subscriber unit as claimed in claim 26 wherein said schedule additionally includes second timing data associated with second and third channel identities, said second and third channel identities being associated with third and fourth cells, respectively, of said plurality of moving cells, and said subscriber unit additionally comprises:

means, coupled to said schedule receiver, for determining whether said second and third channels whose identities are listed in said schedule indicate that communication in said both of said third and fourth cells is possible;

means, coupled to said determining means, for selecting one of said third and fourth cells when said subscriber unit can communicate in both of said third and fourth cells; and means, coupled to said selecting means, for transferring said subscriber unit communications to said selected one of said third and fourth cells.

* * * * *